US011958298B2

(12) United States Patent
Saito et al.

(10) Patent No.: US 11,958,298 B2
(45) Date of Patent: Apr. 16, 2024

(54) LIQUID DISCHARGE APPARATUS, LIQUID DISCHARGE METHOD, AND RECORDING MEDIUM

(71) Applicants: Yosuke Saito, Kanagawa (JP); Atsushi Hada, Kanagawa (JP); Yuki Tsuchiya, Kanagawa (JP); Daisuke Mezaki, Kanagawa (JP)

(72) Inventors: Yosuke Saito, Kanagawa (JP); Atsushi Hada, Kanagawa (JP); Yuki Tsuchiya, Kanagawa (JP); Daisuke Mezaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 278 days.

(21) Appl. No.: 17/440,803

(22) PCT Filed: May 27, 2020

(86) PCT No.: PCT/IB2020/054994
§ 371 (c)(1),
(2) Date: Sep. 20, 2021

(87) PCT Pub. No.: WO2020/245702
PCT Pub. Date: Dec. 10, 2020

(65) Prior Publication Data

US 2022/0212479 A1 Jul. 7, 2022

(30) Foreign Application Priority Data

Jun. 3, 2019 (JP) ................................ 2019-104023

(51) Int. Cl.

| | |
|---|---|
| ***B41J 2/21*** | (2006.01) |
| ***B41J 2/045*** | (2006.01) |
| ***B41J 2/155*** | (2006.01) |

(52) U.S. Cl.
CPC ........... *B41J 2/2121* (2013.01); *B41J 2/0451* (2013.01); *B41J 2/04551* (2013.01); *B41J 2/155* (2013.01)

(58) Field of Classification Search
CPC .... B41J 2/2121; B41J 2/0451; B41J 2/04551; B41J 2/155
See application file for complete search history.

(56) References Cited

U.S. PATENT DOCUMENTS 9,566,799 B1 * 2/2017 Barkley ................ B41J 19/145
2012/0081461 A1 4/2012 Kakutani
(Continued)

FOREIGN PATENT DOCUMENTS

CN 1342553 A 4/2002
CN 1385304 A 12/2002
(Continued)

OTHER PUBLICATIONS

Office Action dated Mar. 7, 2023 in Japanese Patent Application No. 2019-104023, 7 pages.
(Continued)

*Primary Examiner* — Sharon Polk
(74) *Attorney, Agent, or Firm* — XSENSUS LLP

(57) ABSTRACT

A liquid discharge method for a liquid discharge apparatus having a plurality of print modes includes determining and changing. The determining determines the print modes by a determiner. The changing changes, based on the print mode determined by the determiner, a use nozzle width and a discharge amount of a spot color head in a line feed direction such that a print mode having a low print speed has a narrower nozzle width and a larger discharge amount than a print mode having a high print speed by a controller.

19 Claims, 15 Drawing Sheets

(56) References Cited

U.S. PATENT DOCUMENTS

| | | | | |
|---|---|---|---|---|
| 2016/0193868 | A1 | 7/2016 | Tsuchiya | |
| 2016/0243820 | A1 | 8/2016 | Yanaka et al. | |
| 2016/0257129 | A1 | 9/2016 | Ohara | |
| 2016/0297207 | A1 | 10/2016 | Chang | |
| 2017/0106685 | A1* | 4/2017 | Yoshikawa ............ | B41J 2/2121 |
| 2018/0257388 | A1 | 9/2018 | Tashiro et al. | |
| 2018/0297371 | A1* | 10/2018 | Yoshida ................. | B41J 2/2117 |
| 2019/0270316 | A1 | 9/2019 | Tsuchiya | |

FOREIGN PATENT DOCUMENTS

| | | | |
|---|---|---|---|
| CN | 1438121 | A | 8/2003 |
| CN | 1854915 | A | 11/2006 |
| CN | 101148123 | A | 3/2008 |
| CN | 101204873 | A | 6/2008 |
| CN | 103213394 | A | 7/2013 |
| CN | 104044372 | A | 9/2014 |
| JP | 2003-285427 | | 10/2003 |
| JP | 2017-222159 | A | 12/2017 |
| JP | 2018-149808 | A | 9/2018 |

OTHER PUBLICATIONS

International Search Report dated Jul. 27, 2020 in PCT/IB2020/054994 filed on May 27, 2020, 10 pages.

Office Action dated Nov. 18, 2022 in Chinese Patent Application No. 202080035338.4, 6 pages.

* cited by examiner

| | FORWARD PATH | BACKWARD PATH |
|---|---|---|
| SURFACE ROUGHNESS | ROUGH | SMOOTH |
| GLOSS | LOW | HIGH |
| DOT SHAPE |  |  |

LIQUID DISCHARGE APPARATUS, LIQUID DISCHARGE METHOD, AND RECORDING MEDIUM

CROSS-REFERENCE TO RELATED APPLICATION

The present application is based on PCT filing PCT/IB2020/054994, filed May 27, 2020, which claims priority to Japanese Patent Application 2019-104023, filed Jun. 3, 2019, the entire contents of which are incorporated herein by reference.

TECHNICAL FIELD

Embodiments of the present invention relate to a liquid discharge apparatus, a liquid discharge method, and a recording medium.

BACKGROUND ART

Conventionally, there has been known a liquid discharge apparatus that discharges an ink (liquid) from a head and forms an image (or performs modeling) on a medium. In the liquid discharge apparatus, before printing is performed on a transparent medium, printing with a white ink is performed as a base of a color image. This printing method is referred to as "front printing". The front printing can prevent light from passing through a transparent medium due to the white ink, and therefore can achieve a vivid color expression.

On the other hand, after a color image is printed on a transparent medium, a white ink may be printed. This printing method is referred to as "back printing" and can improve durability against rubbing due to friction on a printing surface. In addition, since an image is viewed through the transparent medium, a printing effect can be enhanced.

Conventionally, a technique such as gravure printing has been used for these printing applications of "front printing" and "back printing". However, this requires preparation of a plate, also requires time for preparing the plate, and therefore is not suitable for printing of many kinds in a small amount.

For these reasons, in recent years, an inkjet printer not requiring a plate has become widespread. Among the inkjet printers, an ultraviolet (UV) inkjet printer uses a UV ink that is cured by being irradiated with ultraviolet light (hereinafter, referred to as UV light).

The UV inkjet printer can instantaneously cure the ink by irradiating the ink with UV light after discharging the ink. For this reason, there is little permeation or bleeding of the ink into a recording medium, and printing can be performed not only on plain paper but also on various media such as a film-shaped packaging material, a plate-shaped plastic, an acrylic base material, metal, and glass.

Regarding such a UV inkjet printer, for example, as disclosed in PTL 1 (JP-2003-285427-A), a system including a plurality of white heads and process color heads for performing front printing and back printing has been proposed.

CITATION LIST

Patent Literature

[PTL 1]
JP-2003-285427-A

SUMMARY OF INVENTION

Technical Problem

Here, in recent years, in the industrial printing market, both high productivity (high-speed printing) and high image quality have been demanded. When high-speed printing is implemented by a UV inkjet printer, the amount of ink discharged from a head per unit time (ink discharge amount) needs to be increased compared to the amount of ink discharged at a normal printing speed in order to move a carriage at high speed. For this reason, a plurality of heads is arranged inside the carriage to perform high-speed printing. In this case, it is necessary to cure an ink discharged in a large amount per unit time by UV light in a short time.

However, when the increased amount of ink is cured in a short time with UV light, a leveling state (wet spread of ink) after UV curing is different between a dot discharged on a forward path and a dot discharged on a backward path, gloss banding (bidirectional banding) which is a phenomenon that a gloss difference is generated on a printing surface occurs, and image quality deteriorates.

The present invention has been achieved in view of the above-described problems, and an object of the present invention is to provide a liquid discharge apparatus, a liquid discharge method, and a liquid discharge program capable of achieving both high productivity (high-speed printing) and high image quality.

Solution to Problem

A liquid discharge apparatus has a plurality of print modes. The liquid discharge apparatus includes a determiner and a controller. The determiner determines the print modes. The controller changes, based on the print mode determined by the determiner, a use nozzle width and a discharge amount of a spot color head in a line feed direction such that a print mode having a low print speed has a narrower nozzle width and a larger discharge amount than a print mode having a high print speed.

Advantageous Effects of Invention

The present invention exhibits an effect that both high productivity (high-speed printing) and high image quality can be achieved.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
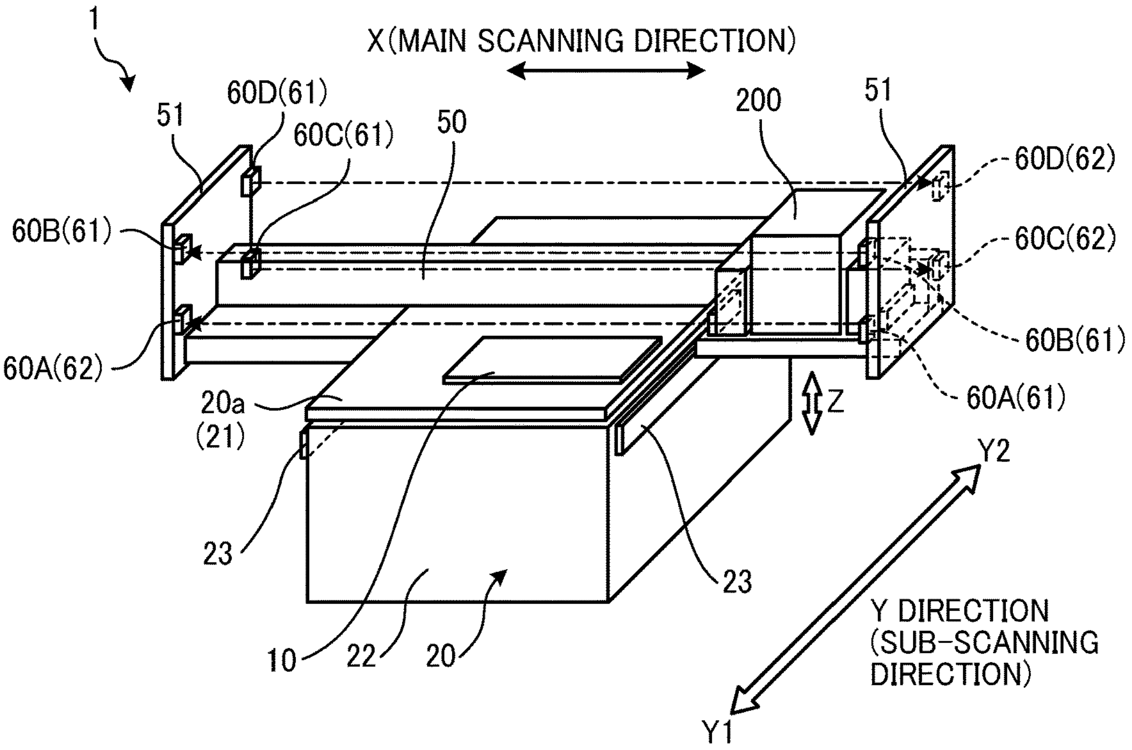
FIG. 1 is a perspective view of a liquid discharge apparatus according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a liquid discharge apparatus according to an embodiment will be described in detail with reference to the attached drawings. Note that the present embodiments will be described as a liquid discharge apparatus that discharges an ink (liquid) from a head to form an image on a medium. However, the present invention is also applicable to a three-dimensional modeling apparatus that performs modeling on a medium.

First Embodiment

FIG. 1 is a perspective view of a liquid discharge apparatus according to a first embodiment.

Figure 2:
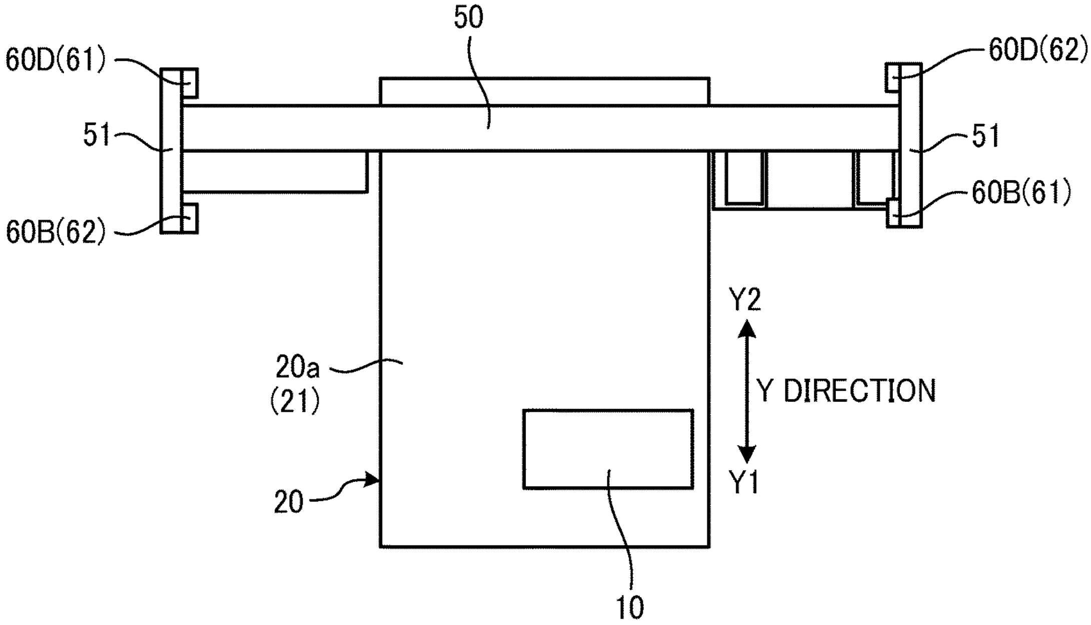
FIG. 2 is a top view of the liquid discharge apparatus according to the first embodiment.

FIG. 2 is a top view of the liquid discharge apparatus according to the first embodiment.

Configuration of Liquid Discharge Apparatus

As illustrated in FIGS. 1 and 2, the liquid discharge apparatus 1 includes a support stage 20 having a stage surface 20*a* on which a print target 10 is placed. The stage surface 20*a* of the support stage 20 on which the print target 10 is placed is constituted by an attraction table 21. An attraction mechanism disposed in a structure 22 generates an attraction force on a surface of the attraction table 21, and attracts the placed print target 10 to the stage surface 20*a*. Note that the print target 10 may be attracted to the stage surface 20*a* by, for example, electrostatic attraction.

In addition, the liquid discharge apparatus 1 includes a gantry 50 supporting a carriage 200 such that the carriage 200 can reciprocate in a first direction X (main scanning direction) with respect to the stage surface 20*a* of the support stage 20. The gantry 50 is disposed so as to be able to reciprocate (relatively move) in a second direction Y (sub-scanning direction) orthogonal to the first direction with respect to the stage surface 20*a* of the support stage 20. The movement of the gantry 50 in the Y direction is controlled by reading sub-scanning encoder sheets 23 arranged on both sides of the support stage 20 with a sub-scanning encoder sensor disposed in the gantry 50.

In the gantry 50, both side plates 51 and 51 each include four sets of height detection sensors (thickness measurement sensors) 60 (60A to 60D) including a light emitting unit 61 and a light receiving unit 62, the height detection sensors being arranged facing each other with the stage surface 20*a* of the support stage 20 interposed therebetween. The height detection sensors 60A and 60C are arranged at a height different from the height of the height detection sensors 60B and 60D.

Therefore, the height detection sensor 60 can detect presence or absence of the print target 10 across the support stage 20 in the first direction, and can detect presence or absence of the print target 10 in the entire area of the stage surface 20*a* of the support stage 20 in the first direction.

By moving the height detection sensor 60 together with the gantry 50 in the second direction, it is possible to detect presence or absence of the print target 10 in the entire area of the stage surface 20*a* of the support stage 20 in the second direction. This makes it possible to detect presence or absence of the print target 10 in the entire area of the stage surface 20*a* of the support stage 20.

The gantry 50 is disposed so as to be able to move (rise and fall) in the height direction (Z direction), and the height detection sensor 60 raises and lowers the gantry 50 to adjust the height of the attraction table 21 of the support stage 20 in the Z direction. Note that the height detection sensor 60 also serves as a human sensor.

By disposing a sensor holding member that can rise and fall in the gantry 50, the height detection sensor 60 may adjust the height.

Figure 3:
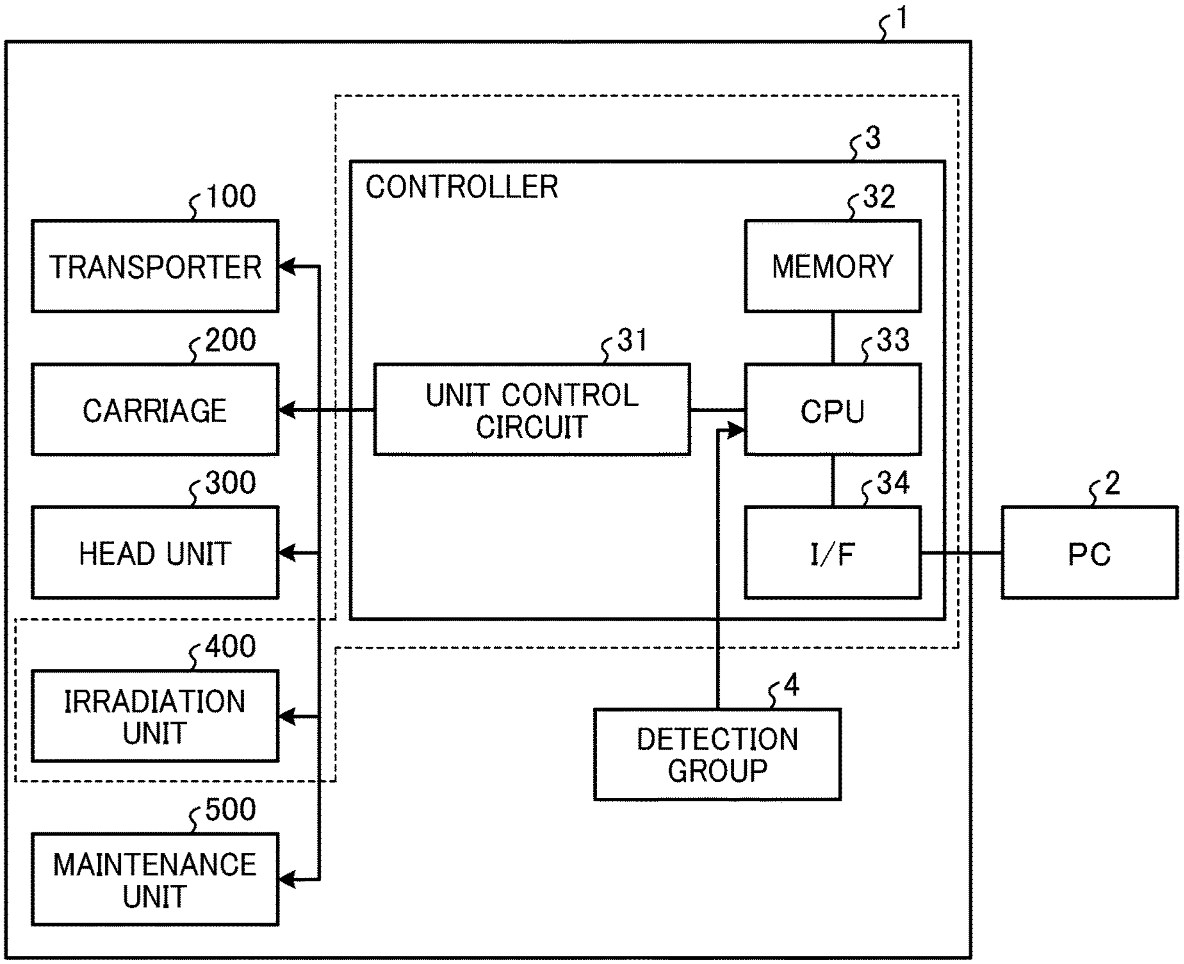
FIG. 3 is a block diagram illustrating a hardware configuration of the liquid discharge apparatus according to the first embodiment.
Figure 4:
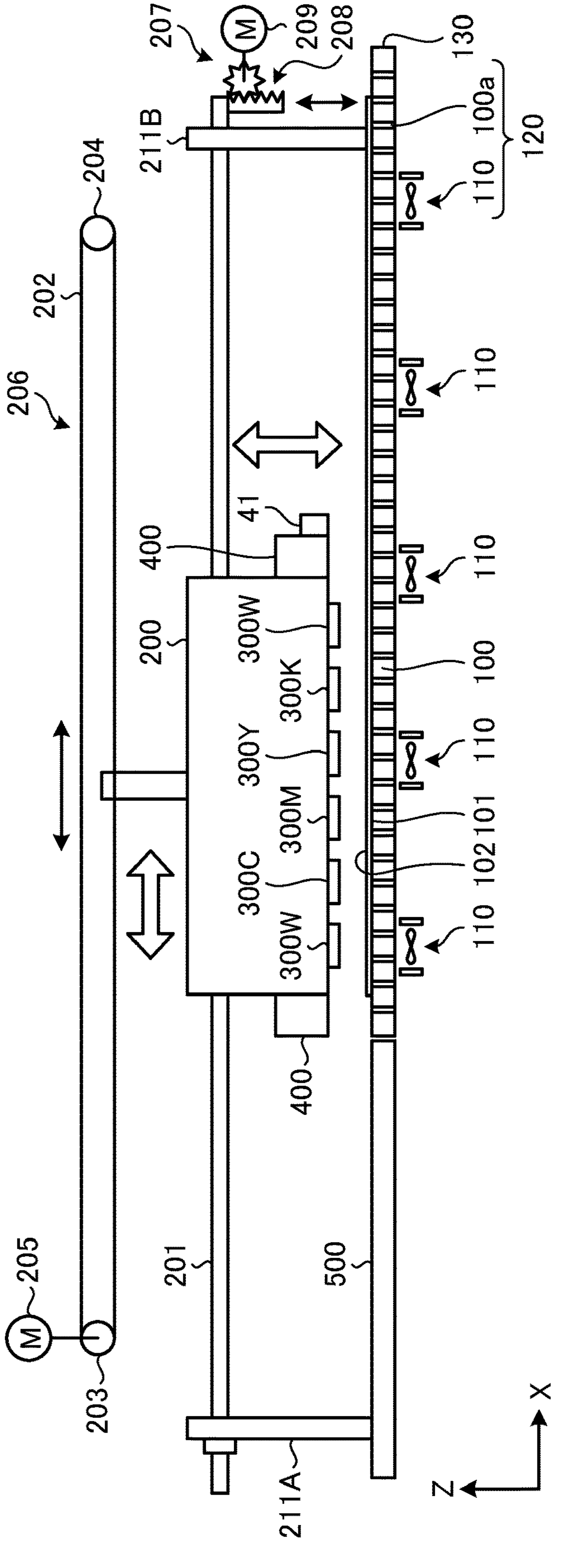
FIG. 4 is a front view of the liquid discharge apparatus.
Figure 5:
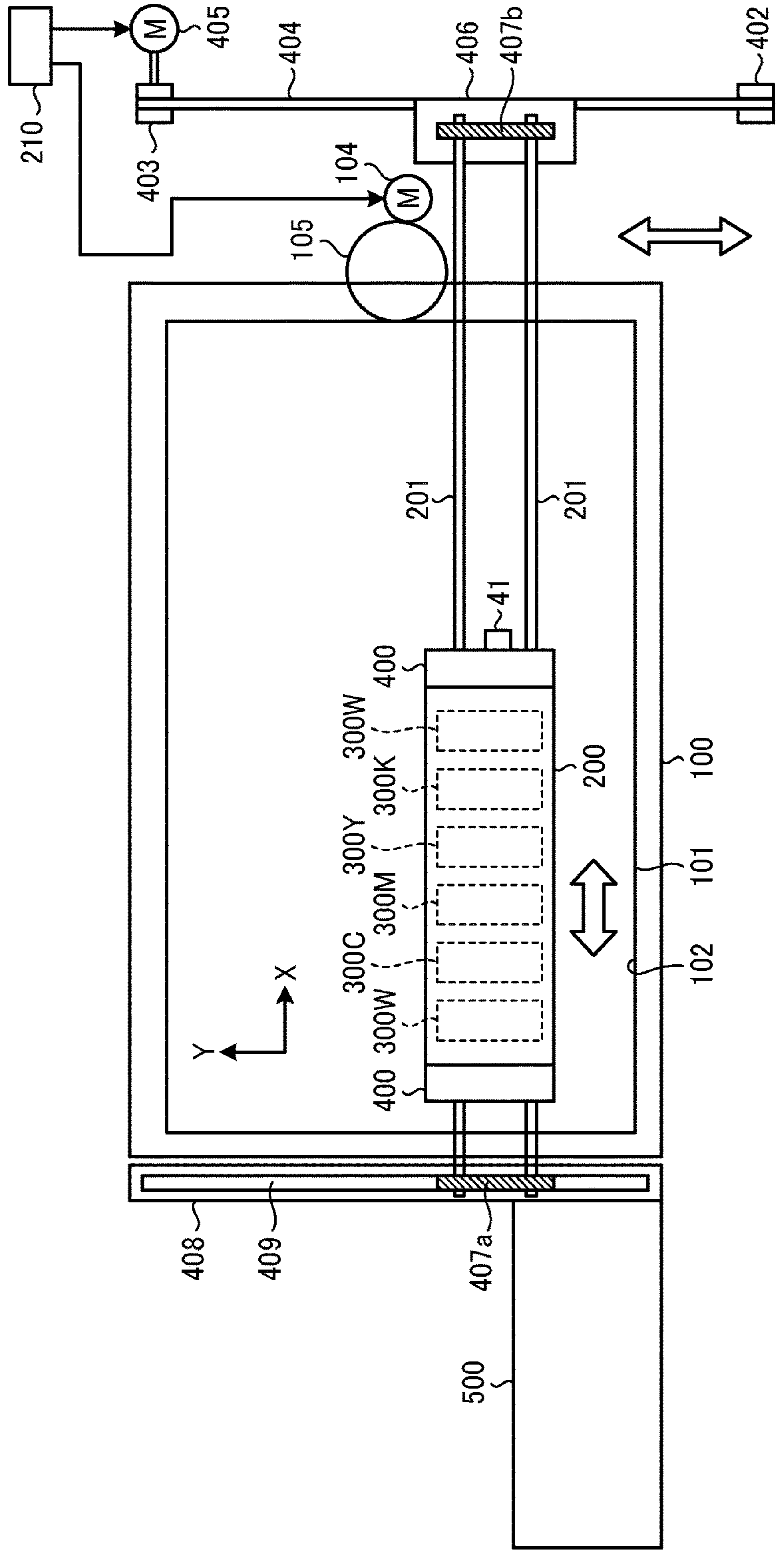
FIG. 5 is a plan view of the liquid discharge apparatus.

Next, FIG. 3 is a block diagram illustrating a hardware configuration of the liquid discharge apparatus according to the first embodiment. FIG. 4 is a front view of the liquid discharge apparatus. FIG. 5 is a plan view of the liquid discharge apparatus.

As illustrated in FIG. 3, the liquid discharge apparatus 1 according to the first embodiment includes a controller unit 3, a detection group 4, a transport unit 100 which is a transporter, the carriage 200, a head unit 300, an irradiation unit 400, and a maintenance unit 500.

The controller unit 3 includes a unit control circuit 31, a memory 32 that stores various types of data, a central processing unit (CPU) 33 which is a control main body, and an interface (I/F) 34.

The unit control circuit 31 controls an operation of each of the units (transport unit 100, carriage 200, head unit 300, irradiation unit 400, and maintenance unit 500) of the liquid discharge apparatus 1 according to an instruction from the CPU 33.

The I/F 34 is an interface for connecting the liquid discharge apparatus 1 to an external personal computer (PC) 2. Note that as a connection form between the liquid discharge apparatus 1 and the PC 2, for example, the liquid discharge apparatus 1 and the PC 2 can be connected to each other via a network or directly by a communication cable.

Examples of the detection group 4 include various sensors included in the liquid discharge apparatus 1, such as a height sensor 41 illustrated in FIGS. 2 and 3. The memory 32 stores various programs or data executable by the CPU 33. Note that examples of the memory 32 include a semiconductor memory such as a read only memory (ROM) or a random access memory (RAM), and an optical, magnetic, and electric recording media such as a hard disk, a compact disc (CD)-ROM, and a digital versatile disk (DVD)-ROM. The memory 32 stores a liquid discharge program described later.

Various programs executed by the liquid discharge apparatus 1 can be provided by being recorded on a computer-readable recording medium such as a CD-ROM, a flexible disk (FD), a CD-R, a DVD, or a Blu-ray (registered trademark) disk in an installable format or an executable format.

Various programs executed by the liquid discharge apparatus 1 may be provided by being stored on a computer connected to a network such as the Internet and downloaded via the network. Various programs executed by the liquid discharge apparatus 1 may be provided or distributed via a network such as the Internet.

The CPU 33 of the controller unit 3 controls an operation of each of the units (transport unit 100, carriage 200, head unit 300, irradiation unit 400, and maintenance unit 500) of the liquid discharge apparatus 1 via the unit control circuit 31 using the memory 32 as a work area. Specifically, the CPU 33 controls the operation of each of the units (transport unit 100, carriage 200, head unit 300, irradiation unit 400, and maintenance unit 500) based on recording data received from the PC 2 and data detected by the detection group 4, and as illustrated in FIG. 4, forms an image which is a liquid application surface 102 on a base material 101 (=print target 10) as a discharge target.

Note that a printer driver is installed in the PC 2, and the printer driver generates recording data to be transmitted to the liquid discharge apparatus 1 based on image data. The recording data includes command data for operating the transport unit 100 and the like of the liquid discharge apparatus 1 and pixel data relating to an image (liquid application surface 102). For example, the pixel data includes 2-bit data for each pixel, and can be expressed in four gradations.

As illustrated in FIG. 4, the transport unit 100 includes a stage 130 and an attraction mechanism 120. The attraction mechanism 120 has a plurality of attraction holes 100*a* formed in a fan 110 and the stage 130. The attraction mechanism 120 drives the fan 110 and attracts the base material 101 from the attraction holes 100*a* to temporarily secure the base material 101 to the transport unit 100. Note that the attraction mechanism 120 may attract a sheet using electrostatic attraction.

The transport unit 100 moves in the Y-axis direction (sub-scanning direction Y) under control based on a drive signal from the CPU 33 via the unit control circuit 31.

As illustrated in FIG. 5, the transport unit 100 includes a transport controller 210, a roller 105, and a motor 104. The transport controller 210 drives the motor 104 and rotates the roller 105 to move the base material 101 in the Y-axis direction (sub-scanning direction Y).

Note that the transport unit 100 may move the carriage 200 instead of the base material 101 in the Y-axis direction (sub-scanning direction Y). That is, the transport unit 100 relatively moves the base material 101 and the carriage 200 in the Y-axis direction (sub-scanning direction Y).

As illustrated in FIG. 5, the transport unit 100 includes a side plate 407*b* supporting two guides 201 that guide the carriage 200 in the X-axis direction (main scanning direction X), a table 406 supporting the side plate 407*b*, a belt 404 secured to the table 406, a driving pulley 403 and a driven pulley 402 between which the belt 404 is stretched, and a motor 405 that rotates and drives the driving pulley 403.

Furthermore, as illustrated in FIG. 5, the transport unit 100 includes a side plate 407*a* supporting the two guides 201 that guide the carriage 200 in the X-axis direction (main scanning direction X), a table 408 slidably supporting the side plate 407*a*, and a groove 409 that is formed on the table 408 and guides the side plate 407*a* in the sub-scanning direction Y.

The transport unit 100 drives the motor 405 with the transport controller 210 to rotate the driving pulley 403 and to move the belt 404 in the Y-axis direction (sub-scanning direction Y). By moving the table 406 on which the carriage 200 is supported in the Y-axis direction (sub-scanning direction Y) along with movement of the belt 404, the carriage 200 can be moved in the Y-axis direction (sub-scanning direction Y). The side plate 407*a* moves in the Y-axis direction (sub-scanning direction Y) along the groove 409 of the table 408 along with movement of the table 406 in the Y-axis direction (sub-scanning direction Y).

Movement of the carriage 200 in the Z-axis direction (height direction Z) and the X-axis direction (main scanning direction X) is controlled based on a drive signal from the CPU 33 (unit control circuit 31).

The carriage 200 moves for scanning along the guide 201 in the main scanning direction X (X-axis direction). A scanner 206 includes a driving pulley 203, a driven pulley 204, a driving belt 202, and a motor 205. The carriage 200 is secured to the driving belt 202 stretched between the driving pulley 203 and the driven pulley 204. By driving the driving belt 202 with the motor 205, the carriage 200 moves for scanning in the main scanning direction X right and left. The guide 201 is supported by side plates 211A and 211B of the apparatus main body. A height adjuster 207 includes a motor 209 and a slider 208. The height adjuster 207 drives the motor 209 and moves the slider 208 up and down to move the guide 201 up and down. By moving the guide 201 up and down, the carriage 200 moves up and down, and the height of the carriage 200 with respect to the base material 101 can be adjusted.

Next, the head unit 300 is disposed on a lower surface of the carriage 200. Although details will be described later, the head unit 300 includes heads that discharge black (300K), cyan (300C), magenta (300M), yellow (300Y), and white (300W) UV curable inks, respectively.

Each of the heads of the head unit 300 includes a piezo element (piezoelectric element). The piezo element performs a contraction movement in response to a drive signal supplied from the CPU 33 (unit control circuit 31). As a result, a pressure changes due to the contraction movement, the UV curable ink is discharged onto the base material 101, and the liquid application surface 102 is formed on the base material 101.

Note that examples of the UV curable ink include an ink containing a methacrylate-based monomer. The methacrylate-based monomer has weak skin sensitization to irritate the skin due to an excessive immune reaction by a chemical substance advantageously.

Figure 6:
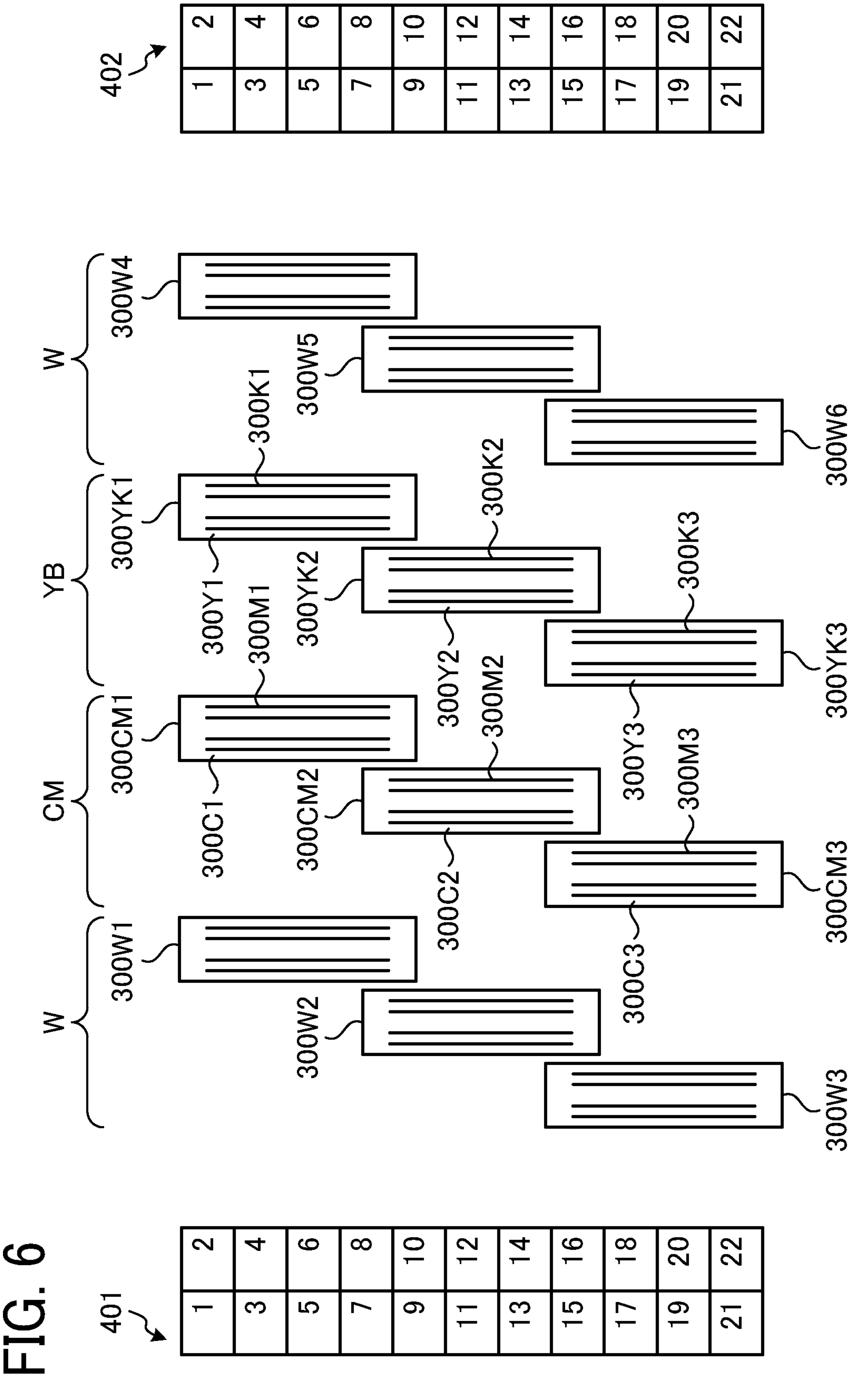
FIG. 6 is a diagram illustrating a configuration of a head unit and an irradiation unit of the liquid discharge apparatus according to the first embodiment.

FIG. 6 is a diagram illustrating a configuration of the head unit 300 and the irradiation unit 400. As illustrated in FIG. 6, the head unit 300 includes, for example, a total of 12 heads. Among the heads, three heads (300W1, 300W2, and 300W3) arranged on the left side and three heads (300W4, 300W5, and 300W6) arranged on the right side are heads for white (for W).

The three heads 300W1 to 300W3 arranged on the left side are arranged so as to be continuous in a stepwise manner in the sub-scanning direction (line feed direction), and arranged so as to form a linear white pixel in the sub-scanning direction without interruption of white pixels for the three heads. Similarly, the three heads 300W4 to 300W6 arranged on the right side are arranged so as to be continuous in a stepwise manner in the sub-scanning direction, and arranged so as to form a linear white pixel in the sub-scanning direction without interruption of white pixels for the three heads. Each of the heads 300W1 to 300W6 includes four nozzles.

The three heads 300CM1 to 300CM3 arranged at the center are cyan and magenta heads. Each of the heads 300CM1 to 300CM3 includes four nozzle rows. Of these nozzle rows, two nozzle rows corresponding to each of 300C1 to 300C3 are cyan nozzles, and similarly, two nozzle rows corresponding to each of 300M1 to 300M3 are magenta nozzles.

The three heads 300YK1 to 300YK3 arranged at the center are yellow and black heads. Each of the heads 300YK1 to 300YK3 includes four nozzles rows. Of these nozzle rows, two nozzle rows corresponding to each of 300K1 to 300K3 are yellow nozzles, and similarly, two nozzle rows corresponding to each of 300K1 to 300K3 are black nozzles.

The irradiation unit 400 includes UV irradiation devices 401 and 402 that emit UV light. The UV irradiation devices 401 and 402 are disposed on side surfaces (surfaces in the X-axis direction (main scanning direction X)) of the carriage 200, respectively. The UV irradiation devices 401 and 402 of the irradiation unit 400 emit UV light based on a drive signal from the CPU 33 (unit control circuit 31).

Next, an image forming operation of the liquid discharge apparatus 1 will be described. The transport unit 100 moves in the Y-axis direction (sub-scanning direction Y) based on a drive signal from the CPU 33, and positions the base material 101 at an initial position for forming an image (liquid application surface 102).

Subsequently, the CPU 33 moves the carriage 200 to a height suitable for discharging a UV curable ink by the head unit 300 (for example, a height at which a head gap between the head unit 300 and the base material 101 is 1 mm). Note that the CPU 33 monitors the height of the head unit 300 based on a detection signal from the height sensor 41.

Subsequently, the CPU 33 reciprocates the carriage 200 in the X-axis direction (main scanning direction X). At the time of this reciprocation, the CPU 33 controls the driving of the head unit 300 so as to discharge a UV curable ink. As a result, an image for one scan (liquid application surface 102) is formed on the base material 101.

Subsequently, when an image (liquid application surface 102) for one scan is formed on the base material 101, the CPU 33 controls movement of the transport unit 100 for one scan in the Y-axis direction (sub-scanning direction Y). The moving operation in the Y-axis direction is called “line feed”, and the amount of movement in the Y-axis direction is called “line feed amount (=line feed width)”.

Thereafter, until formation of an image (liquid application surface 102) is completed, executions of the operation of forming an image (liquid application surface 102) for one scan and the operation of moving the transport unit 100 in the Y-axis direction (sub-scanning direction Y) for one scan (scan operation) are alternately controlled.

The number of times of the scan operations (line feed amount) differs depending on the resolution in the Y-axis direction. In a case of low resolution, since the number of scans is small (line feed amount is large), high-speed printing (high production) can be performed. On the other hand, in a case of high resolution, since the number of scans is large (line feed amount is small), it is difficult to perform high-speed printing, but high image quality can be achieved.

When formation of an image (liquid application surface 102) on the base material 101 is completed, a UV curable ink is leveled (smoothed), and UV light is emitted from the irradiation unit 400 to cure the UV curable ink. Irradiation with UV light by the irradiation unit 400 is performed when the carriage 200 is moved to a height suitable for discharging the UV curable ink by the head unit 300 and reciprocates in the X-axis direction (main scanning direction X).

Here, as described above, the head unit 300 includes six process color heads (cyan, magenta, yellow, and black) at the center, and six white heads 300W1 to 300W6 on the left and right. In the present embodiment, when front printing and back printing are performed, white heads arranged on the left and right are used. Among the three rows of white heads, one or two rows are used. Hereinafter, a method for performing front printing and back printing will be described.

Note that in this example, the white head is disposed as a spot color head, but a spot color head of another spot color such as a clear color or a metallic color may be disposed.

Figure 7:
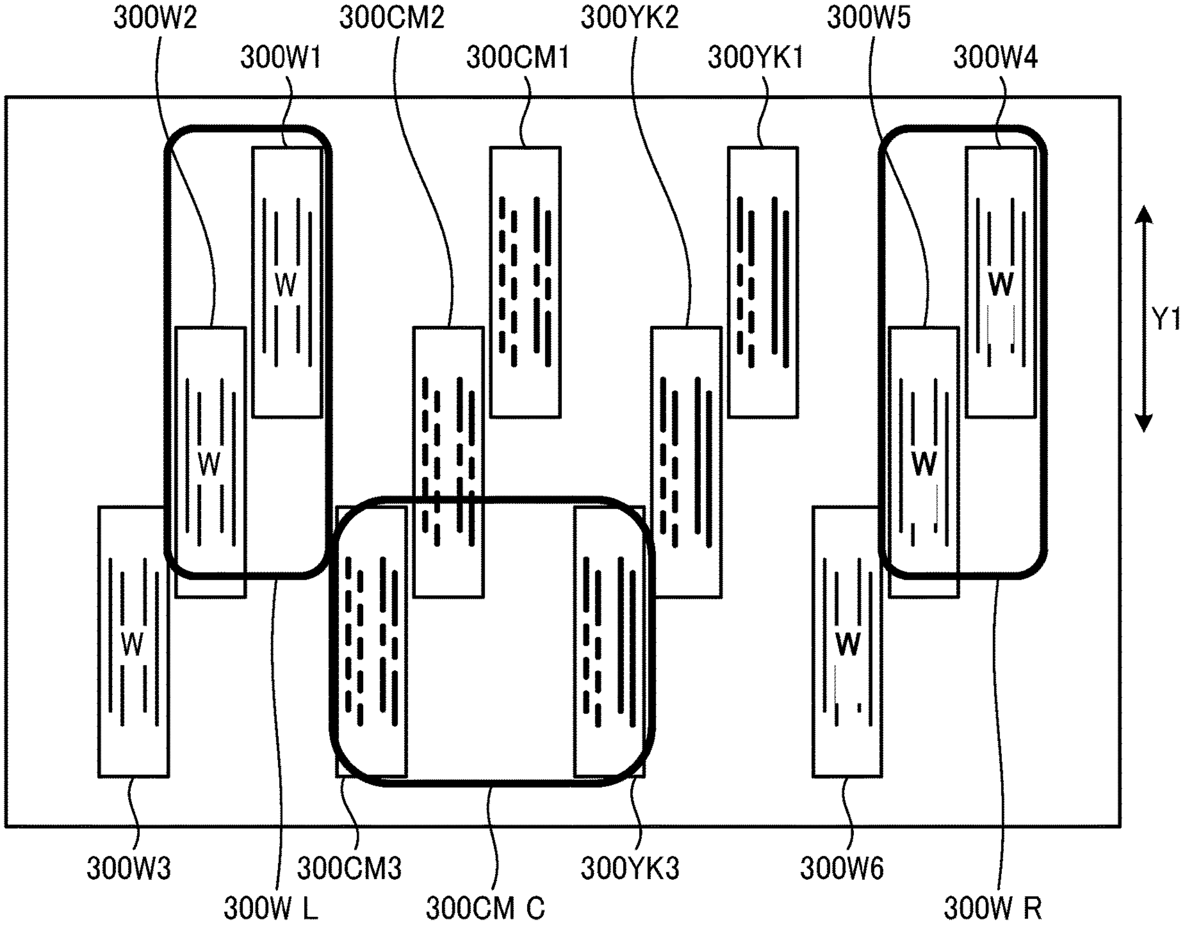
FIG. 7 is a schematic diagram of a head unit for explaining the positions of white heads used in front printing using two rows of white heads.

FIG. 7 is an example of front printing using two rows of white heads. The term “two rows” means that two rows are used among the three rows of heads arranged in the sub-scanning direction. When the carriage that has been waiting in an initial state moves and the heads 300W1, 300CM1, 300YK1, and 300W4 reach a print area, the carriage reciprocates. In this case, the white heads 300W1 and 300W4 discharge a white ink to form a white base. Next, when the carriage 200 is moved by line feed in the Y-axis direction, and the white heads 300W2 and 300W5 and the process color heads 300CM2 and 300YK2 reach a print area, the white heads 300W2 and 300W5 discharge a white ink and superimpose a white ink layer to complete the white base. At this time, the process color heads 300CM2 and 300YK2 discharge no color ink. In this case, the white heads 300W1 and 300W2 arranged on the left side are used, and the white heads 300W4 and 300W5 arranged on the right side are used. Therefore, a head having a nozzle length of Y1 is used.

Formation of the white base is completed, and the carriage 200 is moved by line feed in the Y-axis direction. Thereafter, when the white head 300W3, the process color head 300CM3, the process color head 300YK3, and the white head 300W6 reach a print area, the process color heads 300CM3 and 300YK3 superimpose a color image to form a final image. At this time, the white heads 300W3 and 300W6 discharge no white ink.

Figure 8:
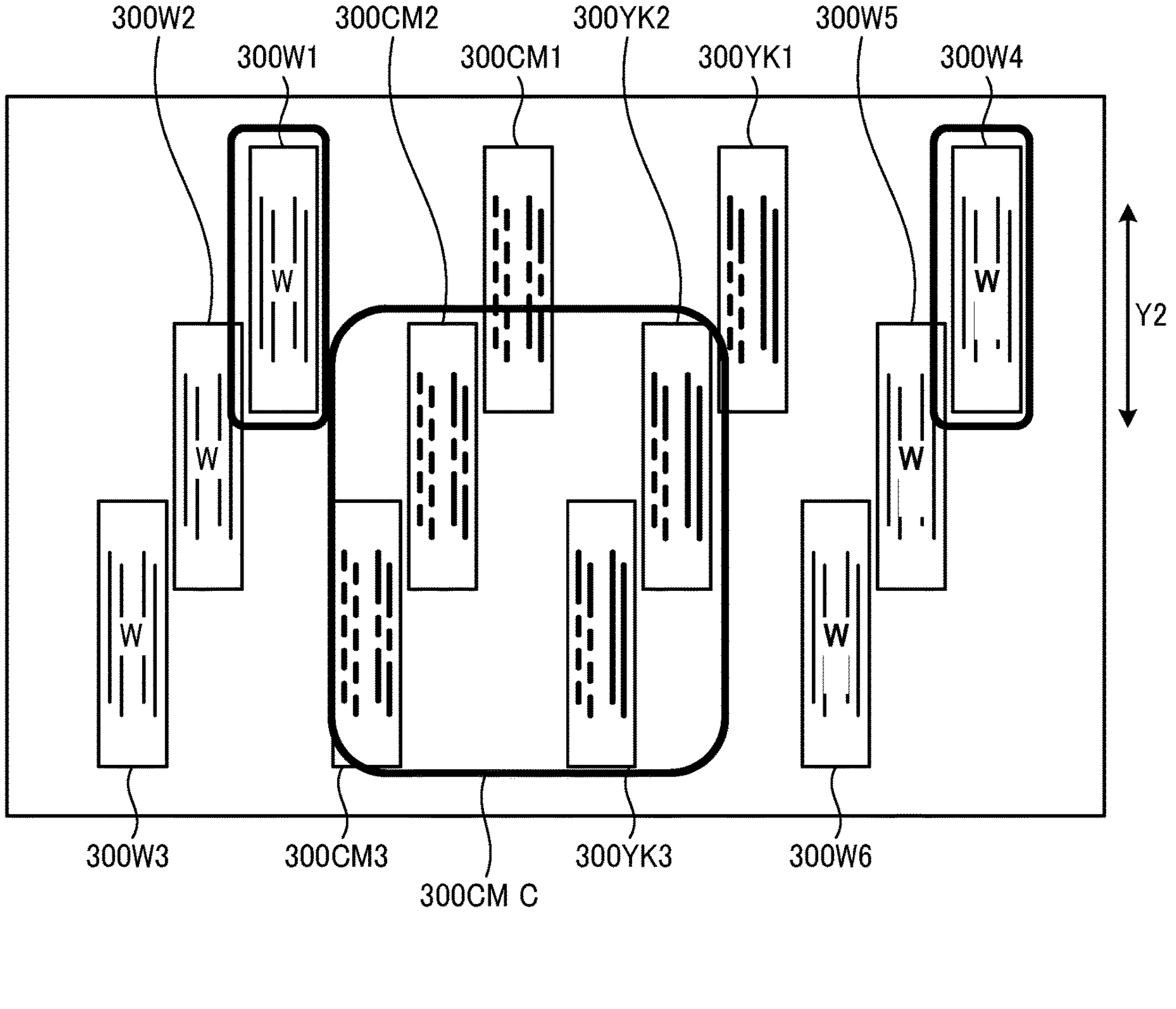
FIG. 8 is a schematic diagram of a head unit for explaining the positions of white heads used in front printing using one row of white heads.

FIG. 8 is an example of front printing using one row of white heads. The term "one row" means that one row is used among the three rows of heads arranged in the sub-scanning direction. In this case, when the carriage 200 that has been waiting at an initial position is moved, and the white head 300W1, the process color head 300CM1, the process color head 300YK1, and the white head 300W4 reach a print area, reciprocation of the carriage 200 is controlled, and the white heads 300W1 and 300W4 discharge a white ink. At this time, the process color heads 300CM1 and 300YK1 discharge no color ink.

Next, line feed of the carriage 200 is controlled in the Y-axis direction. By repeating this operation several times (the number of scan operations), formation of the white base is completed.

Next, when line feed of the carriage 200 is controlled in the Y-axis direction again, and the white head 300W2, the process color head 300CM2, the process color head 300YK2, and the white head 300W5 reach a print area, the process color heads 300CM2 and 300YK2 form a color image on the white base. By repeating this operation several times, a color image is completed. At this time, the white heads 300W2 and 300W5 discharge no white ink.

Thereafter, when line feed of the carriage 200 is controlled in the Y-axis direction again, and the white head 300W3, the process color head 300CM3, the process color head 300YK3, and the white head 300W6 reach a print area, the process color heads 300CM3 and 300YK3 superimpose a color image to complete an image. At this time, the white heads 300W3 and 300W6 discharge no white ink. In this case, the white head 300W1 disposed on the left side is used, and the white head 300W4 disposed on the right side is used. Therefore, a head having a nozzle length of Y2 is used.

Figure 9:
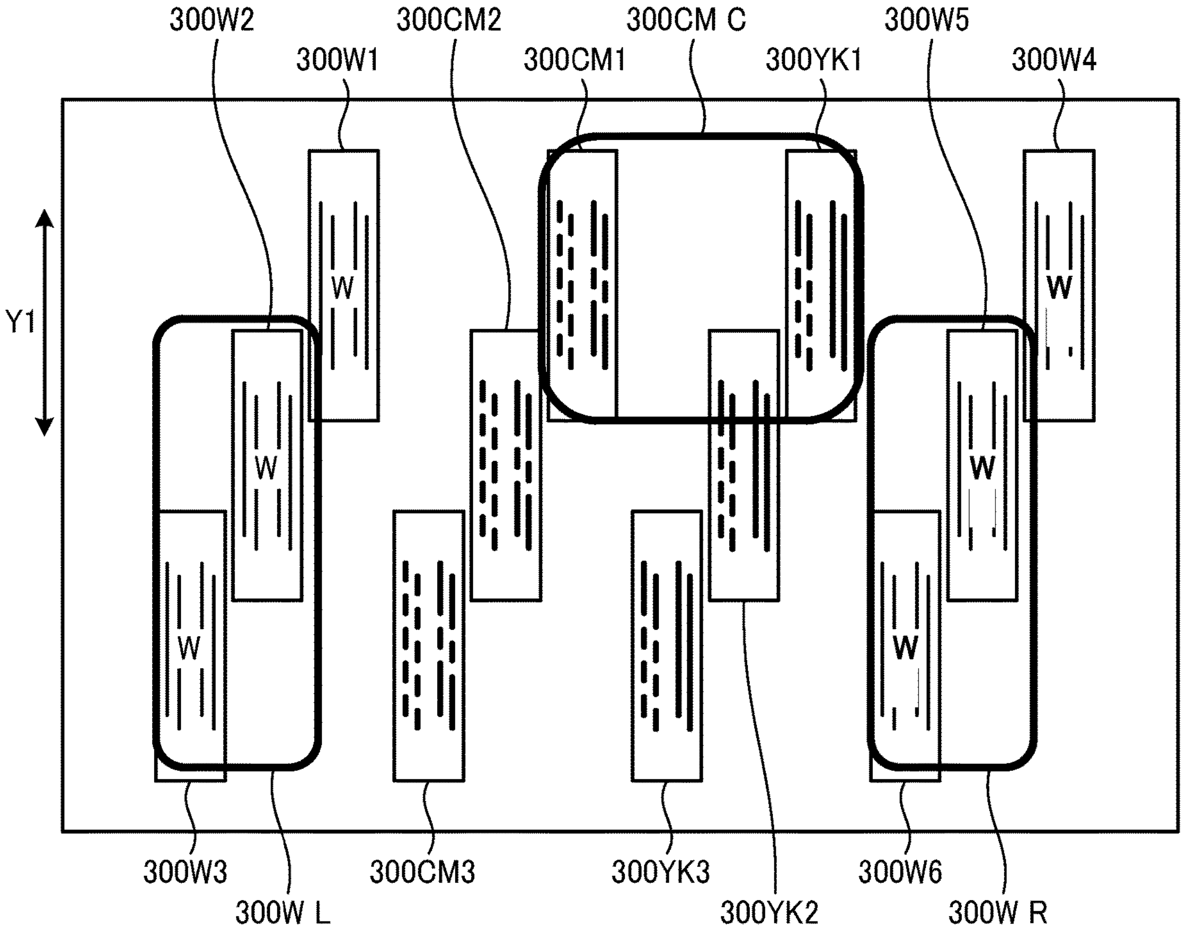
FIG. 9 is a schematic diagram of a head unit for explaining the positions of white heads used in back printing using two rows of white heads.

Next, FIG. 9 illustrates an example of back printing using two rows of white heads. In this case, the process color heads 300CM1 and 300YK1 discharge a color ink to form a color image.

Next, when line feed of the carriage 200 is controlled in the Y-axis direction, and the white head 300W2, the process color head 300CM2, the process color head 300YK2, and the white head 300W5 reach a print area, the white heads 300W2 and 300W5 discharge a white ink. At this time, the process color heads 300CM2 and 300YK2 discharge no color ink.

Next, when line feed of the carriage 200 is controlled in the Y-axis direction again, and the white head 300W3, the process color head 300CM3, the process color head 300YK3, and the white head 300W6 reach a print area, the white heads 300W3 and 300W6 discharge a white ink to complete a final image. At this time, the process color heads 300CM3 and 300YK3 discharge no color ink. In this case, the white heads 300W2 and 300W3 arranged on the left side are used, and the white heads 300W5 and 300W6 arranged on the right side are used. Therefore, a head having a nozzle length of Y1 is used as in the case of FIG. 7.

Figure 10:
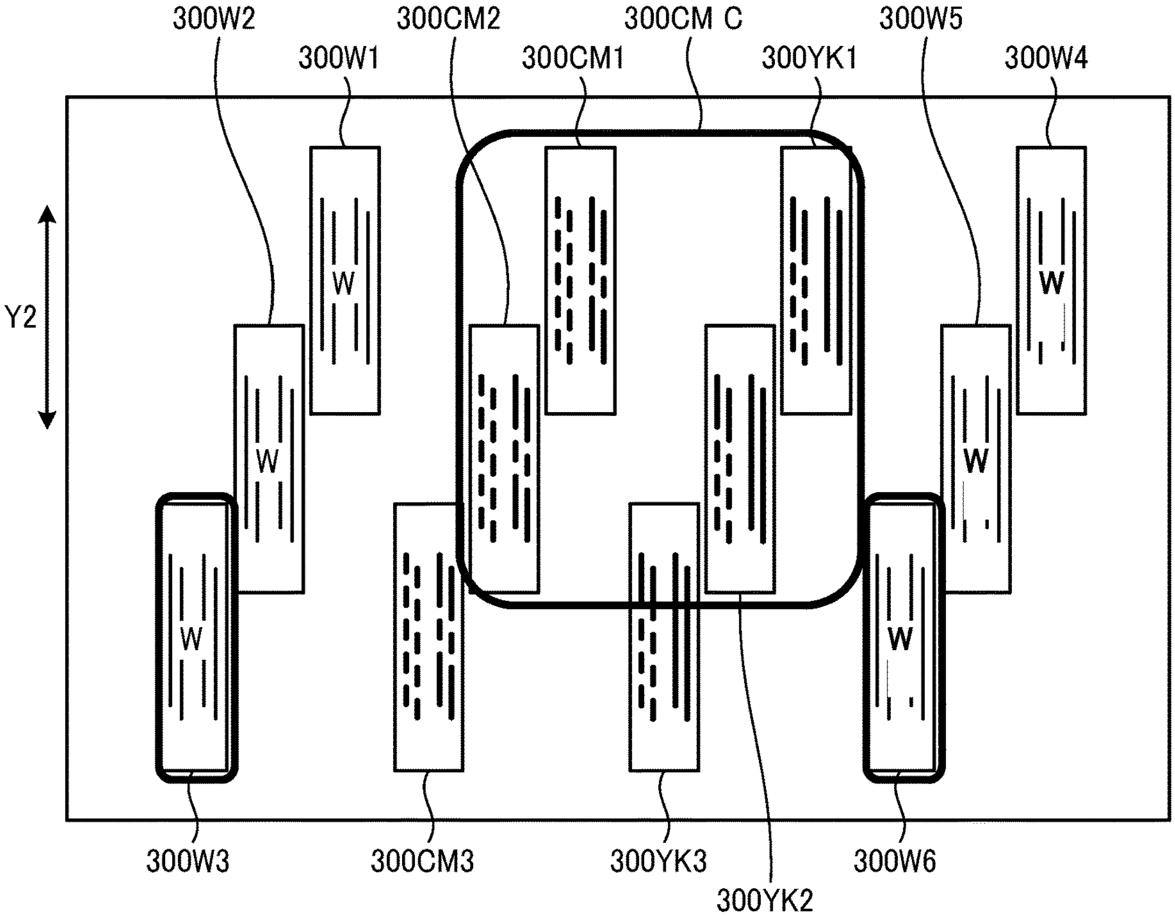
FIG. 10 is a schematic diagram of a head unit for explaining the positions of white heads used in back printing using one row of white heads.

Next, FIG. 10 illustrates an example of back printing using one row of white heads. Next, when the white head 300W1, the process color head 300CM1, the process color head 300YK1, and the white head 300W4 reach a print area, the process color heads 300CM1 and 300YK1 discharge a color ink. At this time, the white heads 300W1 and 300W4 discharge no white ink.

Next, when line feed of the carriage 200 is controlled in the Y-axis direction, and the white head 300W2, the process color head 300CM2, the process color head 300YK2, and the white head 300W5 reach a print area, the process color heads 300CM2 and 300YK2 discharge a color ink to end formation of a color image. At this time, the white heads 300W2 and 300W5 discharge no white ink.

Next, when line feed of the carriage 200 is controlled in the Y-axis direction again, and the white head 300W3, the process color head 300CM3, the process color head 300YK3, and the white head 300W6 reach a print area, the white heads 300W3 and 300W6 discharge a white ink to complete a final image. At this time, the process color heads 300CM3 and 300YK3 discharge no color ink. In this case, the white head 300W3 disposed on the left side is used, and the white head 300W6 disposed on the right side is used. Therefore, a head having a nozzle length of Y2 is used as in the case of FIG. 8.

The liquid discharge apparatus 1 according to the embodiment has several types of modes according to an application. In a productivity-emphasizing mode that emphasizes productivity is referred to as, for example, a "draft mode" or a "production mode", and an image quality-emphasizing mode that reduces productivity and emphasizes image quality is referred to as, for example, a "quality mode", a "high quality mode", or a "fine mode".

Figure 11:
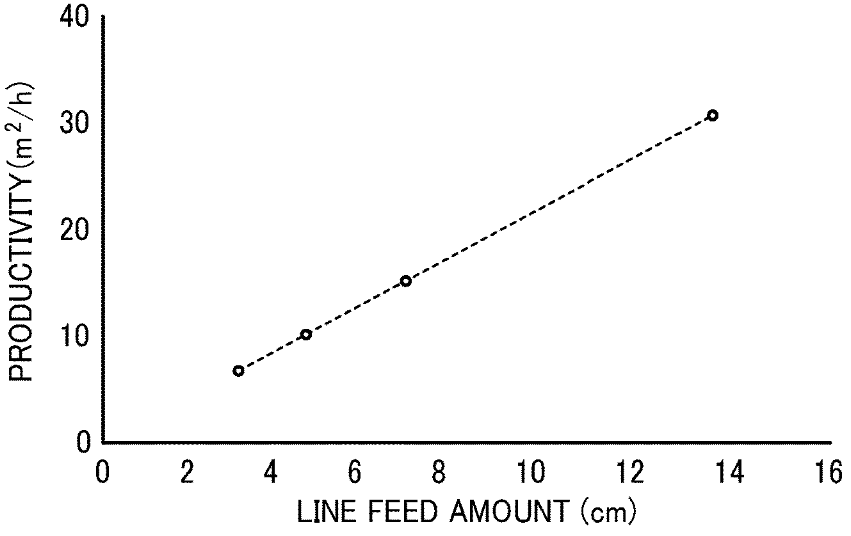
FIG. 11 is a graph illustrating a relationship between a line feed amount during printing and productivity of a printed material.

FIG. 11 is a graph illustrating a relationship between a line feed amount and productivity. The line feed amount and productivity are calculated from the number of nozzles of a head being used, nozzle resolution, the number of scans, a head arrangement condition, and the like. In recent years, in the industrial printing market, high productivity has been demanded. In order to increase productivity, it is only required to reduce the number of scans and to increase the line feed amount.

Figure 12:
FIG. 12 is a table for explaining a difference in dot shape between a forward path and a backward path of a head.
Figure 12:

However, in order to achieve high productivity, the amount of ink discharged per scan increases, and therefore gloss banding is likely to occur. That is, FIG. 12 is an example illustrating the dot shape of an ink on a forward path or a backward path of the carriage 200. As illustrated in FIG. 12, on the forward path of the carriage 200, a surface of a dot is rough and the gloss is low, whereas on the backward path, the surface of the dot is smooth and the gloss is high. Gloss banding is likely to occur due to a difference in dot surface roughness and gloss between the forward path and the backward path of the carriage 200.

In the liquid discharge apparatus 1 according to the embodiment, by arranging six white ink heads (300W1 to 300W6) on the left and right sides as illustrated in FIG. 6, high-speed printing (high productivity) of a white ink can be achieved. However, in order to find a condition for causing gloss banding with respect to the line feed amount and the productivity, whether or not gloss banding occurred was studied for each of discharge amounts of the white ink.

In an inkjet recording method, an image is completed by a plurality of scan operations, but image data for each scan is generated using a print mask function. In this study, the amount of ink to be discharged was increased or decreased by using a tool for changing a parameter of the print mask function. A discharge amount was calculated by converting a weight difference of the base material 101 before and after printing and an image area into the weight of one head.

Figure 13:
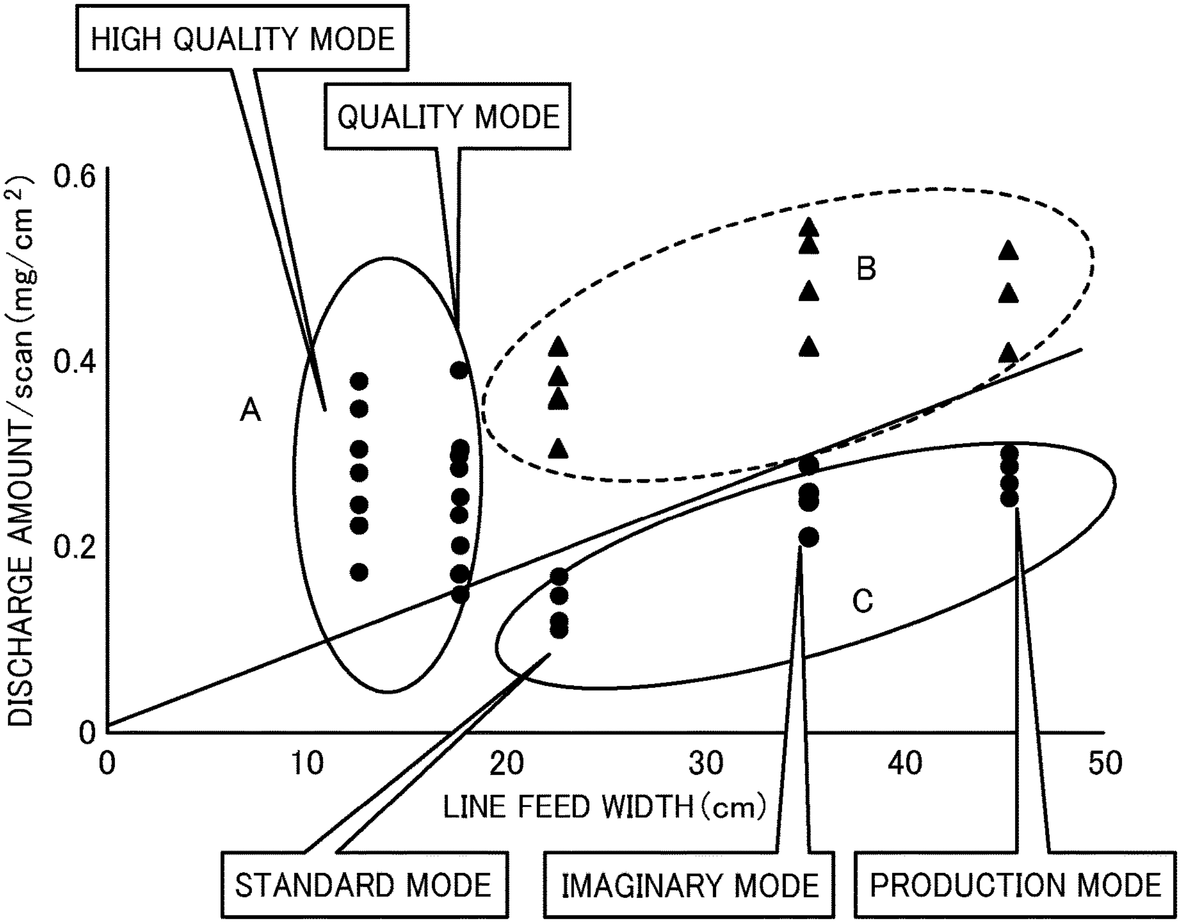
FIG. 13 is a graph obtained by plotting a relationship between a discharge amount (mg/cm$^2$) per scan of one head and a line feed amount (cm).
Figure 14:
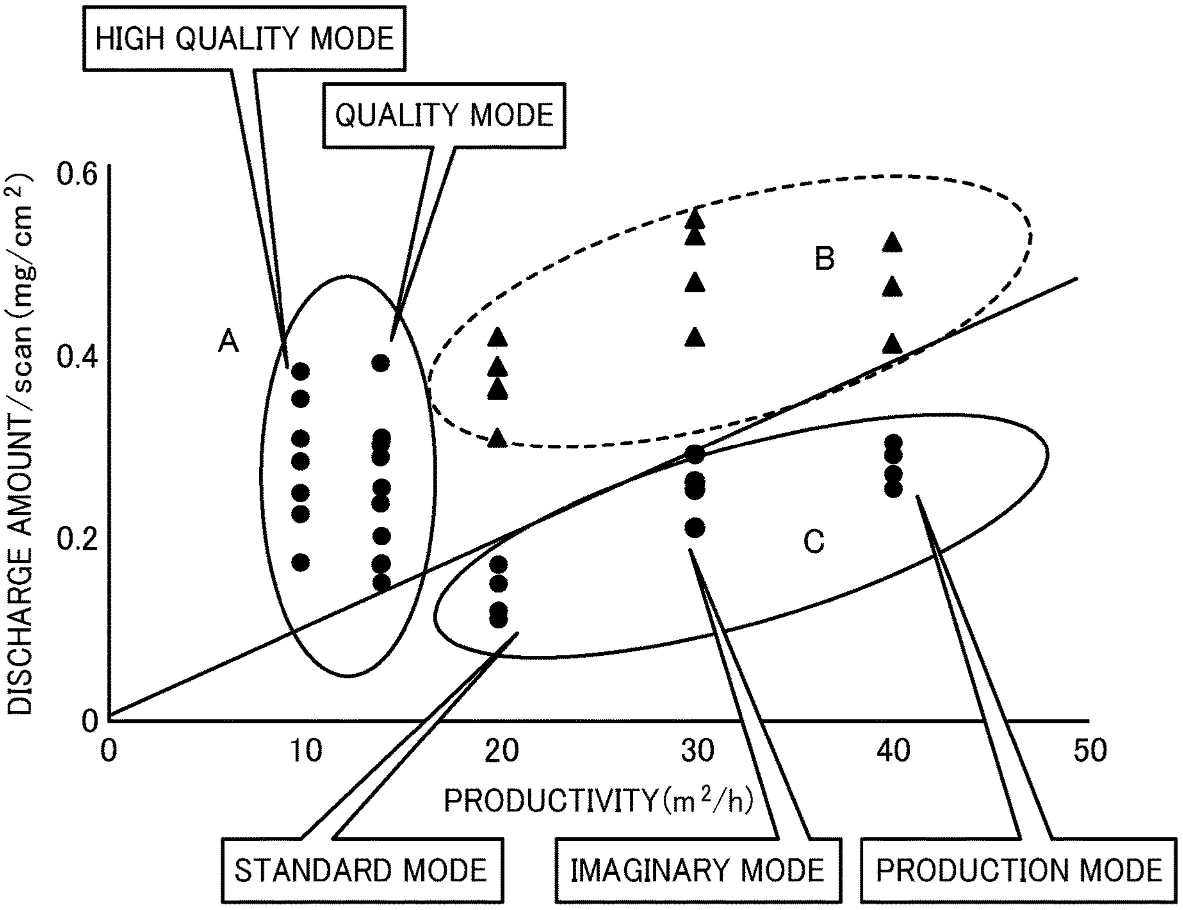
FIG. 14 is a graph obtained by plotting a relationship between a discharge amount (mg/cm$^2$) per scan of one head and productivity (m$^2$/h).

FIG. 13 is a graph obtained by plotting a relationship between a discharge amount (mg/cm$^2$) per scan of one head and a line feed amount (cm). FIG. 14 is a graph obtained by plotting a relationship between a discharge amount (mg/cm$^2$) per scan of one head and productivity (m$^2$/h).

Gloss banding can be improved by lowering the ink discharge amount. However, when the ink discharge amount is less than a certain amount, the density (white concealing property) of the white base cannot be secured. For this reason, FIGS. 13 and 14 are graphs in which conditions under which the white concealing property can be secured are plotted. Note that the white concealing property means that a white ink layer printed on a transparent base material conceals a base. A reflection density is measured while a black sheet is laid as an underlay under a white patch image printed on the transparent base material.

FIGS. 13 and 14 plot data of five different print modes (high quality mode, quality mode, standard mode, production mode, and imaginary mode). The range A illustrated in FIGS. 13 and 14 is a range in which there is no disadvantage in gloss banding even with a one-row configuration of white heads. Under a condition in which the line feed amount is small and the productivity is low, there is no disadvantage in gloss banding and white concealing property as long as the discharge amount is within a range of 0.2 to 0.4 mg/$cm^2$.

On the other hand, the range B illustrated in FIGS. 13 and 14 illustrates a condition in which gloss banding does not occur although the discharge amount is required to be 0.2 mg/$cm^2$ or more in order to secure the white concealing property in a one-row configuration of white heads. That is, it is indicated that the condition in which the line feed amount is 7 mm or more (FIG. 13) and the productivity exceeds 20 $m^2$/h (FIG. 14) is disadvantageous for gloss banding. Note that under this condition of the range B, gloss banding is reduced by lowering the ink discharge amount. However, in this case, the white concealing property is largely reduced disadvantageously.

A condition of the range C illustrated in FIGS. 13 and 14 is a range in which both the white concealing property and prevention of gloss banding are achieved while the liquid discharge apparatus 1 according to the embodiment has a two-row configuration of white heads.

Figure 15:
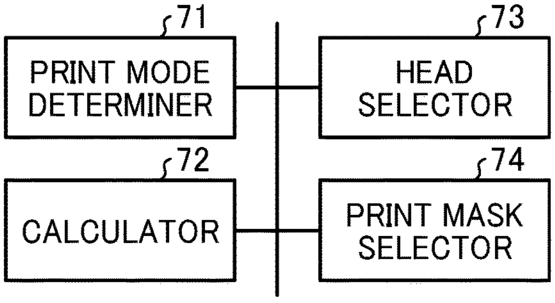
FIG. 15 is a functional block diagram of the liquid discharge apparatus according to the first embodiment.

The liquid discharge apparatus 1 according to the embodiment has a two-row configuration of white heads (nozzle length Y1) under a condition in which the line feed amount is large and the productivity is high. An operation of performing print by selecting the number of head rows according to a line feed amount will be described. In the liquid discharge apparatus 1 according to the embodiment, a liquid discharge program is stored in the memory 32 illustrated in FIG. 3. The CPU 33 executes the liquid discharge program to implement functions of a print mode determiner 71, a calculator 72, a head selector 73, and a print mask selector 74 illustrated in FIG. 15.

Note that the print mode determiner 71 is an example of the determiner. The calculator 72, the head selector 73, and the print mask selector 74 are examples of the controller.

All or some of the functions of the print mode determiner 71 to the print mask selector 74 may be implemented by hardware such as an integrated circuit (IC).

The liquid discharge program may be recorded in a computer-readable recording medium such as a CD-ROM or a flexible disk (FD) with file information in an installable format or an executable format to be provided. The liquid discharge program may be recorded on a computer-readable recording medium such as a CD-R, a DVD, a Blu-ray (registered trademark) disk, or a semiconductor memory to be provided. The liquid discharge program may be provided in a form of being installed via a network such as the Internet. The liquid discharge program may be incorporated in a ROM or the like in an apparatus in advance to be provided.

Figure 16:
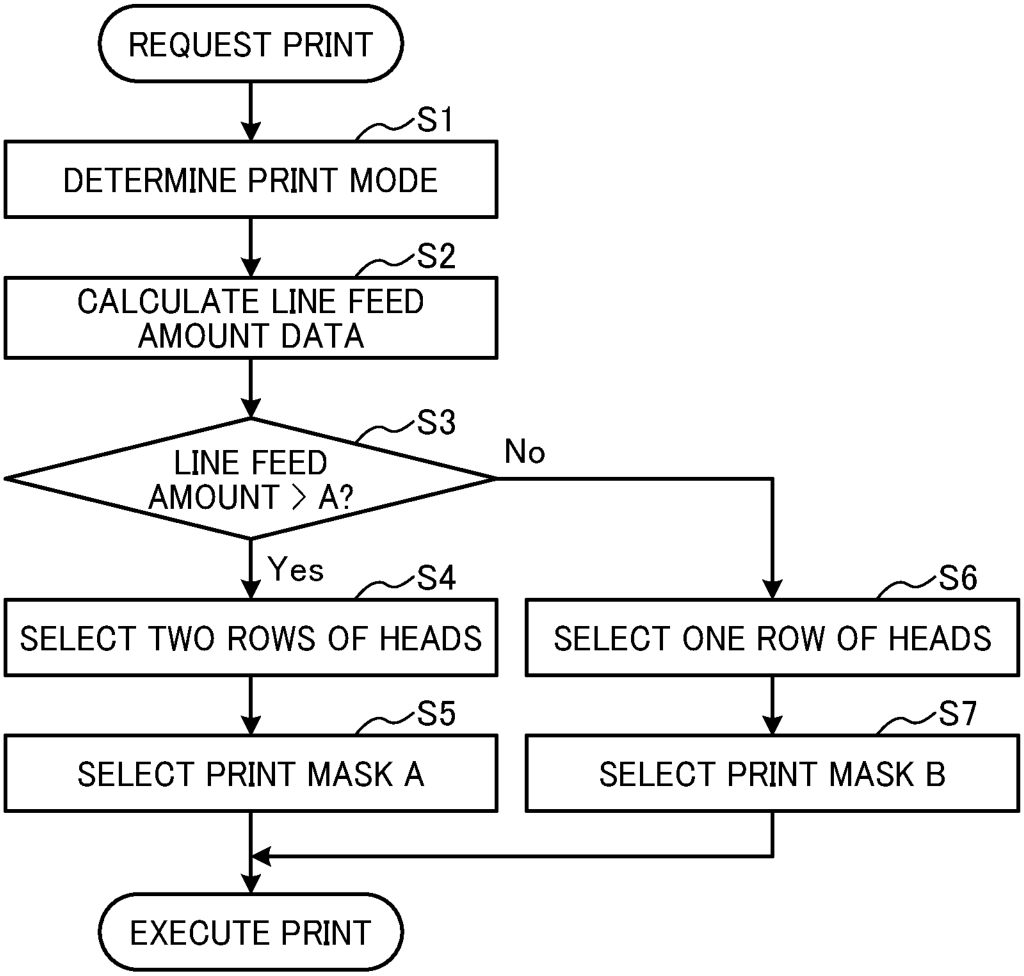
FIG. 16 is a flowchart illustrating a flow of an operation of performing print by selecting the number of head rows according to a line feed amount in the liquid discharge apparatus according to the first embodiment.

FIG. 16 is a flowchart illustrating a flow of an operation of performing print by selecting the number of head rows (nozzle length) according to a line feed amount. In this flowchart, when the PC 2 is operated by an operator and print data is transmitted (print request), the print mode determiner 71 determines a print mode (step S1). The memory 32 stores print condition data such as a line feed amount or productivity for each print mode. The calculator 72 refers to the print condition data to calculate line feed amount data (step S2).

Next, the head selector 73 determines whether or not the line feed amount data is equal to or larger than a predetermined amount "A" (step S3). For example, "A" is "7 mm" in a case where the liquid discharge apparatus according to the embodiment is used. When the line feed amount data is 7 mm or more (step S3: Yes), the head selector 73 selects a two-row configuration of white heads (nozzle length Y1) (step S4). Note that the line feed amount data of 7 mm as an example can be changed to a desired value. For example, it is only required to change the value to a smaller value for a user who is strict in image quality, and it is only required to change the value to a larger value for a user who emphasizes a printing speed.

In a case of front printing, white heads 300WL and 300WR arranged on the left and right in the head arrangement diagram illustrated in FIG. 7 are used, and a process color head 300CMC is used for process colors. At this time, the print mask selector 74 assigns a print mask A to the white heads 300W1 and 300W2 arranged on the left side and the white heads 300W4 and 300W5 arranged on the right side, that is, assigns the print mask A to a white head having a nozzle length of Y1 (step S5). Since the process color heads 300CM3 and 300YK3 are used as the process color heads, a color mask is assigned to these heads. Thereafter, printing is executed (print execution).

On the other hand, when the line feed amount data is less than 7 mm (step S3: No), the head selector 73 selects a one-row configuration of white heads (step S6). In this case, the head selector 73 selects the white heads 300W1 and 300W4 arranged at both ends in the head arrangement illustrated in FIG. 8, and selects the process color head 300CMC for color. At this time, the print mask selector 74 assigns a print mask B to the white heads 300W1 and 300W4 arranged on the left side, that is, assigns the print mask B to a white head having a nozzle length of Y2 (step S7). Since the process color heads 300CM2, 300CM3, 300YK2, and 300YK3 are used for color, a color mask is assigned to these heads. Thereafter, printing is executed (print execution).

By changing the print mask in this way, it is possible to change an ink discharge amount according to a row configuration (nozzle length). When a two-row configuration of white heads is used, four white heads are used, and this number of white heads is twice the number in a one-row configuration of white heads (the nozzle length Y1 in the two-row configuration is also twice the nozzle length Y2 in the one-row configuration). Therefore, an ink discharge amount per head is set to be about half the ink discharge amount in the one-row configuration. For this reason, the discharge amount of the print mask A assigned to the two-row configuration of white heads is half the discharge amount of the print mask B of the one-row configuration.

Figure 17:
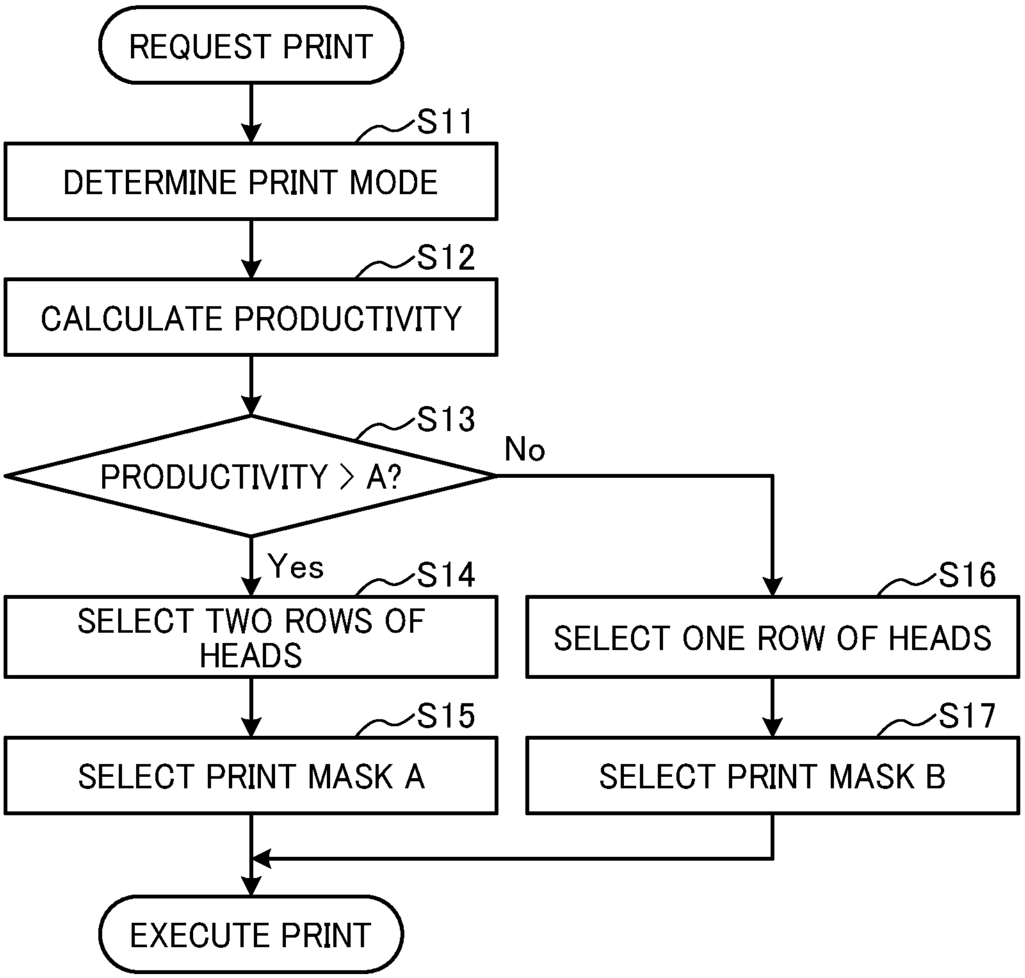
FIG. 17 is a flowchart illustrating a flow of an operation of performing print by selecting the number of head rows according to productivity in the liquid discharge apparatus according to the first embodiment.

Next, FIG. 17 is a flowchart illustrating a flow of an operation of performing print by selecting the number of head rows according to productivity. In the flowchart of FIG. 17, when the PC2 is operated by an operator and print data is transmitted (print request), the print mode determiner 71 determines a print mode (step S11). The memory 32 stores print condition data such as a line feed amount or productivity for each print mode. The calculator 72 refers to the print condition data to calculate productivity data (step S12).

Next, the head selector 73 determines whether or not the productivity data is equal to or larger than a predetermined amount "A" (step S13). For example, "A" is "20 $m^2$/h" in a case where the liquid discharge apparatus according to the embodiment is used. Note that the set value of productivity may be changed according to an application of a user or the like. When the productivity data is equal to or more than 20 $m^2$/h (step S13: Yes), the head selector 73 selects a two-row configuration of white heads (step S14).

In a case of front printing, white heads 300WL and 300WR arranged on the left and right in the head arrangement diagram illustrated in FIG. 7 are used, and a process color head 300CMC is used for process colors. At this time, the print mask selector 74 assigns the print mask A to the white heads 300W1 and 300W2 arranged on the left side and the white heads 300W4 and 300W5 arranged on the right side, that is, assigns the print mask A to a white heads having a nozzle length of Y1 (step S15). Since the process color heads 300CM3 and 300YK3 are used as the process color heads, a color mask is assigned to these heads. Thereafter, printing is executed (print execution).

On the other hand, when the productivity data is less than 20 $m^2$/h (step S13: No), the head selector 73 selects a one-row configuration of white heads (step S16). In this case, the head selector 73 selects the white heads 300W1 and 300W4 arranged at both ends in the head arrangement illustrated in FIG. 8, and selects the process color head 300CMC for color. At this time, the print mask selector 74 assigns the print mask B to the white heads 300W1 and 300W4 arranged on the left side, that is, assigns the print mask B to a white head having a nozzle length of Y2 (step S17). Since the process color heads 300CM2, 300CM3, 300YK2, and 300YK3 are used for color, a color mask is assigned to these heads. Thereafter, printing is executed (print execution).

By changing the print mask in this way, it is possible to change an ink discharge amount according to a row configuration (nozzle length). When a two-row configuration of white heads is used, four white heads are used, and this number of white heads is twice the number in a one-row configuration of white heads (the nozzle length Y1 in the two-row configuration is also twice the nozzle length Y2 in the one-row configuration). Therefore, an ink discharge amount per head is set to be about half the ink discharge amount in the one-row configuration. For this reason, the discharge amount of the print mask A assigned to the two-row configuration of white heads is half the discharge amount of the print mask B of the one-row configuration.

Note that in a case of back printing, a head (nozzle length) to be used is the head described in FIGS. 9 and 10. However, an operation of performing print by selecting the number of head rows according to a line feed amount or productivity is similar to the case of front printing described above.

Effects of First Embodiment

As described above, even under a disadvantageous condition for prevention of gloss banding, by using a two-row configuration of white heads such that the discharge amount is, for example, about half of the discharge amount in the one-row configuration, both a white concealing property and prevention of gloss banding can be achieved without reduction in productivity.

The number of rows of white ink heads is selected according to productivity indicating the number of sheets that can be printed per unit time. That is, a two-row configuration is used under a condition of high productivity. In the case of the two-row configuration, the discharge amount of a white ink only needs to be about half the discharge amount in the one-row configuration. Therefore, even under a condition providing high productivity and being disadvantageous for prevention of gloss banding, by using a two-row configuration of white heads such that the discharge amount is half of the discharge amount in the one-row configuration, both a white concealing property and prevention of gloss banding can be achieved.

The number of rows of white ink heads is selected according to a line feed amount. That is, a two-row configuration is used under a condition of a large line feed amount. In the case of the two-row configuration, the discharge amount of a white ink only needs to be about half the discharge amount in the one-row configuration. Therefore, even under a condition providing a large line feed amount and being disadvantageous for prevention of gloss banding, by using a two-row configuration of white heads such that the discharge amount is half of the discharge amount in the one-row configuration, both a white concealing property and prevention of gloss banding can be achieved.

First Modification

Although the above-described embodiment is an example in which a three-row configuration of white heads is used, a three or more-row configuration of white heads may be used. For example, when a discharge amount required for securing a white concealing property by a plurality of heads is A mg/$cm^2$, the number of rows of white heads used is n, and the number of heads used per row is m, a discharge amount per head only needs to be "A/(n×m)" mg/$cm^2$.

When a white ink discharge amount required for securing a white concealing property is A (mg/$cm^2$), the number of rows of white ink heads selected is n (n represents two or more), and a discharge amount per white ink head is "A/n (mg/$cm^2$)". For this reason, even in the three or more-row configuration of white heads, both a white concealing property and prevention of gloss banding can be achieved.

Second Modification

Although the above-described embodiment is an example in which the row configuration of white heads is changed according to the line feed amount or productivity, the row configuration of white heads may be selected according to resolution. For example, when nozzles in the sub-scanning direction have pitch resolution of 150 dpi (dot per inch), a mode in which the resolution in the sub-scanning direction is 300 dpi to 600 dpi has low to medium resolution, and can be therefore interpreted as a mode with high productivity. A mode of 900 dpi to 1800 dpi has high resolution, and can be therefore interpreted as a mode with low productivity.

For example, a case where the resolution in the sub-scanning direction is equal to or several times the nozzle pitch resolution has low to medium resolution with high productivity. Therefore, a row configuration (nozzle length) in which a plurality of rows of white heads is selected according to the resolution in the sub-scanning direction is used. As a result, it is possible to achieve both a white concealing property and prevention of gloss banding without reduction in productivity as in the first embodiment.

That is, by selecting the number of white ink head rows (nozzle length) according to the resolution in the sub-scanning direction, a two-row configuration (nozzle length Y1) is used in a mode with high productivity. In the case of the two-row configuration (nozzle length Y1), the discharge amount of a white ink only needs to be about half the discharge amount in the one-row configuration (nozzle length Y2). Therefore, even under a condition providing high productivity and being disadvantageous for prevention of gloss banding, by using a two-row configuration of white heads (nozzle length Y1) such that the discharge amount is half of the discharge amount in the one-row configuration (nozzle length Y2), both a white concealing property and prevention of gloss banding can be achieved.

Third Modification Front printing and back printing may be performed simultaneously. In this case, as illustrated in FIG. 6, when the white head 300W1, the process color head 300CM1, the process color head 300YK1, and the white head 300W4 with a three-row configuration reach a print area, the CPU 33 controls color ink discharge from the process color heads 300CM1 and 300YK1. At this time, the CPU 33 does not cause the white heads 300W1 and 300W4 to discharge a white ink.

Next, when line feed of the carriage 200 is controlled in the Y-axis direction, and the white head 300W2, the process color head 300CM2, the process color head 300YK2, and the white head 300W5 reach a print area, the CPU 33 controls white ink discharge from the white heads 300W2 and 300W5. At this time, the CPU 33 does not cause the process color heads 300CM2 and 300YK2 to discharge a color ink.

Next, when the CPU 33 controls line feed of the carriage 200 in the Y-axis direction again, and the white head 300W3, the process color head 300CM3, the process color head 300YK3, and the white head 300W6 reach a print area, the CPU 33 controls color ink discharge from the process color heads 300CM3 and 300YK3. At this time, the CPU 33 does not cause the white heads 300W3 and 300W6 to discharge a white ink.

As described above, in the carriage 200, a plurality of process color heads that discharges process color inks, respectively, and longitudinally three or more rows of white heads that discharge a white ink are arranged at two or more positions. Then, during a printing operation, an image is formed with each of the process colors, then an ink layer is formed with a white ink, and then an image is formed with the process colors. As a result, front printing and back printing can be simultaneously performed on a transparent base material, and an effect similar to the effects of the above-described first embodiment and Modifications can be obtained.

Second Embodiment

Next, a liquid discharge apparatus according to a second embodiment will be described. In the example of the first embodiment described above, as illustrated in FIG. 6, the white heads 300W1 to 300W3 and 300W4 to 300W6 are arranged so as to sandwich the process color heads 300CM1 to 300CM3 and 300YK1 to 300YK3 arranged at the center from the left and right.

Figure 18:
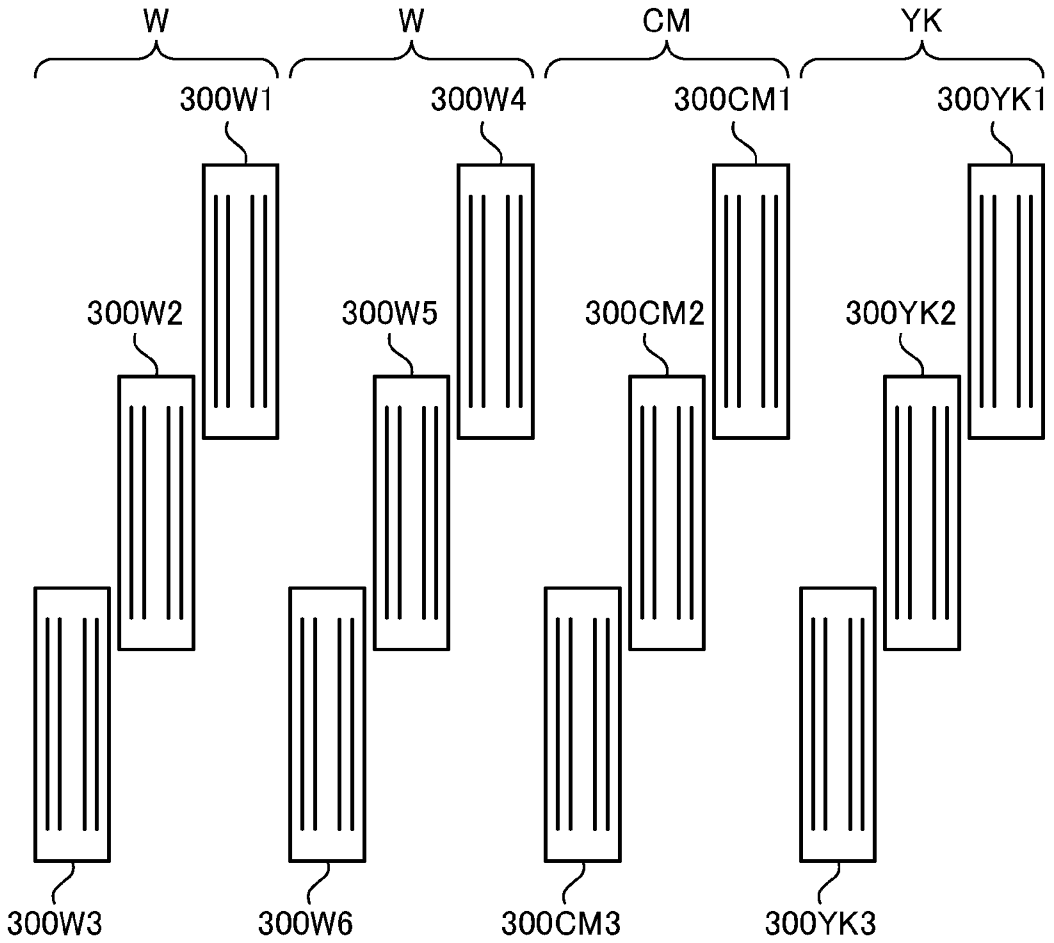
FIG. 18 is a schematic diagram of a head unit of a liquid discharge apparatus according to a second embodiment.

On the other hand, in the second embodiment, as illustrated in FIG. 18, a row of the white heads 300W1 to 300W3, a row of the white heads 300W4 to 300W6, a row of the process color heads 300CM1 to 300CM3, and a row of the process color heads 300YK1 to 300YK3 are sequentially arranged from the left to the right in the main scanning direction.

In other words, in the second embodiment, as illustrated in FIG. 18, the left two rows are the white heads 300W1 to 300W3 and the white heads 300W4 to 300W6, and adjacent to the rows of the white heads 300W1 to 300W6, a row of the process color heads 300CM1 to 300CM3 and a row of the process color heads 300YK1 to 300YK3 are sequentially arranged.

Drive control of the white heads 300W1 to 300W6, the process color heads 300CM1 to 300CM3, and the process color heads 300YK1 to 300YK3 is similar to the drive control described above.

As a result, it is possible to achieve both a white concealing property and prevention of gloss banding without reduction in productivity as in the first embodiment and Modifications described above. Even under a condition providing high productivity and a large line feed amount and being disadvantageous for prevention of gloss banding, a two-row configuration of white heads is used, and the discharge amount is set to, for example, half of the discharge amount in a one-row configuration. As in the first embodiment described above, when a white ink discharge amount required for securing a white concealing property is A mg/cm$^2$, the number of rows of white ink heads selected is n (n represents two or more, the number of heads used per row is m), and a discharge amount per white ink head is A/(n×m) mg/cm$^2$, the number of white ink heads is selected according to the resolution in the sub-scanning direction, and a plurality of rows of white ink heads is selected in the case of a low resolution mode.

Third Embodiment

Next, a liquid discharge apparatus according to a third embodiment will be described. In the example of the second embodiment described above, as illustrated in FIG. 18, the two rows of the white heads 300W1 to 300W3 and the white heads 300W4 to 300W6 are arranged on the right side, and adjacent to the rows of the white heads 300W1 to 300W6, a row of the process color heads 300CM1 to 300CM3 and a row of the process color heads 300YK1 to 300YK3 are sequentially arranged.

Figure 19:
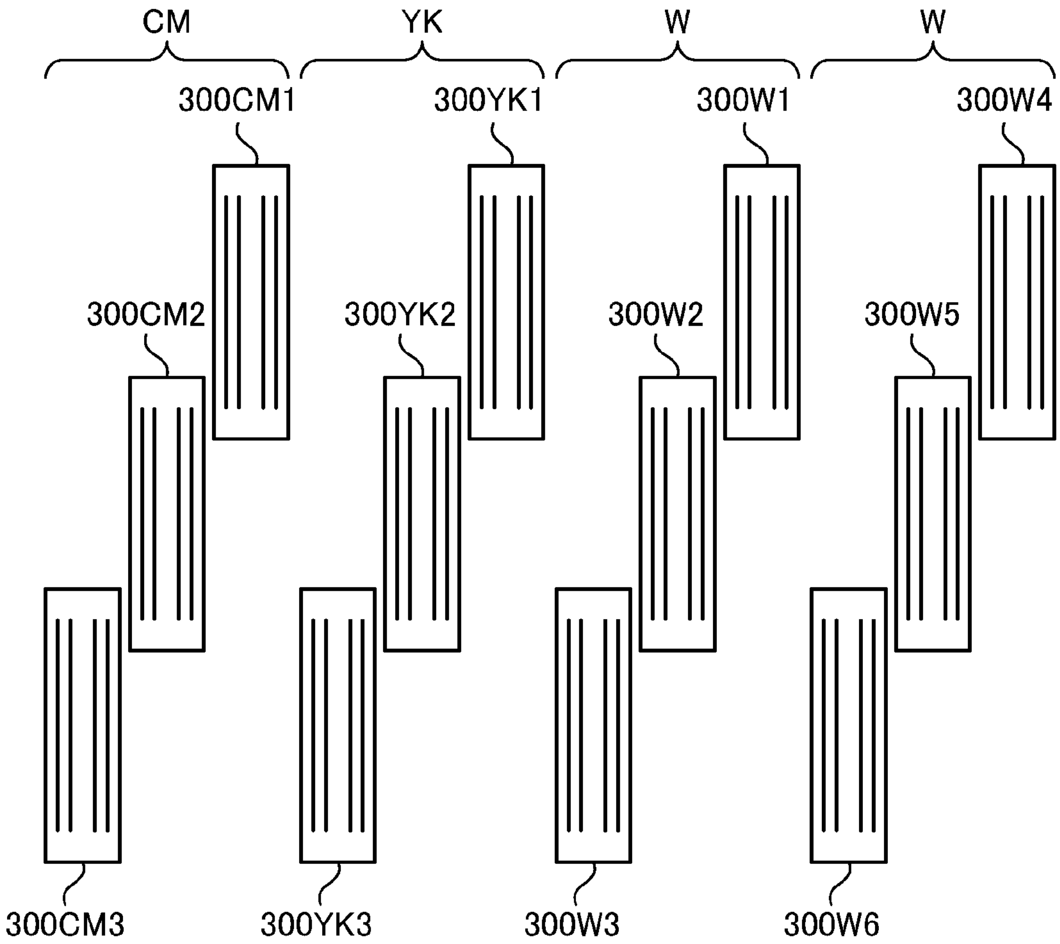
FIG. 19 is a schematic diagram of a head unit of a liquid discharge apparatus according to a third embodiment.

On the other hand, in the third embodiment, as illustrated in FIG. 19, a row of the white heads 300W4 to 300W6, a row of the white heads W1 to W3, a row of the process color heads 300YK1 to 300YK3, and a row of the process color heads 300CM1 to 300CM3 are sequentially arranged from the right to the left in an anti-main scanning direction.

In other words, in the third embodiment, as illustrated in FIG. 19, the right two rows are the white heads 300W1 to 300W3 and the white heads 300W4 to 300W6, and adjacent to the rows of the white heads 300W1 to 300W6, a row of the process color heads 300YK1 to 300YK3 and a row of the process color heads 300CM1 to 300CM3 are sequentially arranged in an anti-main scanning direction.

Drive control of the white heads 300W1 to 300W6, the process color heads 300CM1 to 300CM3, and the process color heads 300YK1 to 300YK3 is similar to the drive control described above.

As a result, it is possible to achieve both a white concealing property and prevention of gloss banding without reduction in productivity as in the first embodiment and Modifications described above. Even under a condition providing high productivity and a large line feed amount and being disadvantageous for prevention of gloss banding, a two-row configuration of white heads (nozzle length Y1) is used, and the discharge amount is set to, for example, half of the discharge amount in a one-row configuration (nozzle length Y2). As in the first embodiment described above, when a white ink discharge amount required for securing a white concealing property is A mg/cm$^2$, the number of rows of white ink heads selected is n (n represents two or more, the number of heads used per row is m), and a discharge amount per white ink head is A/(n×m) mg/cm$^2$, the number of white ink heads is selected according to the resolution in the sub-scanning direction, and a plurality of rows of white ink heads is selected in the case of a low resolution mode.

Finally, each of the above-described embodiments has been presented by way of example, and is not intended to limit the scope of the present invention. Each of the novel embodiments can be implemented in other various forms, and various omissions, replacements, and changes can be made without departing from the gist of the invention.

For example, the "liquid discharge apparatus 1" includes a liquid discharge head or a liquid discharge unit, and drives the liquid discharge head to discharge a liquid. However, examples of the liquid discharge apparatus 1 include not only an apparatus capable of discharging a liquid onto an object to which the liquid can be attached but also an apparatus that discharges a liquid into a gas or a liquid.

The "liquid discharge apparatus 1" may include a means related to feeding, transporting, and ejection of an object to which a liquid can be attached, and may also include a pre-processing device, a post-processing device, and the like.

For example, the "liquid discharge apparatus 1" may be an image forming apparatus that discharges an ink to form an image on a sheet, or a stereoscopic modeling apparatus (three-dimensional modeling apparatus) that discharges a modeling liquid onto a powder layer obtained by forming powder into a layer shape in order to model a stereoscopic modeled object (three-dimensional modeled object).

The "liquid discharge apparatus 1" is not limited to an apparatus in which a significant image such as a character or a graphic is visualized by a discharged liquid. Examples of the liquid discharge apparatus 1 also include an apparatus that forms a pattern or the like having no meaning in itself, and an apparatus that models a three-dimensional image.

The "object to which a liquid can be attached" means an object to which a liquid can be attached at least temporarily, such as an object to which a liquid is attached and adheres, or an object to which a liquid is attached and permeates the object. Specific examples of the "object to which a liquid can be attached" include a recording medium such as a sheet, a recording sheet, a film, or cloth, an electronic component such as an electronic substrate or a piezoelectric element, and a medium such as a powder layer, an organ model, or a test cell. Unless otherwise specified, all objects to which a liquid is attached are included.

A material of the "object to which a liquid can be attached" may be paper, thread, fiber, cloth, leather, metal, plastic, glass, wood, ceramics, or the like as long as a liquid can be attached to the object even temporarily. The "liquid" is not particularly limited as long as having such a viscosity and surface tension that the liquid can be discharged from a head. However, the liquid may preferably have a viscosity of 30 m [Pa·s (Pascal second)] or less at normal temperature and normal pressure or after heating or cooling. More specific examples of the liquid include a solvent such as water or an organic solvent, and a solution, a suspension, and an emulsion containing a colorant such as a dye or a pigment, a function-imparting material such as a polymerizable compound, a resin, or a surfactant, a biocompatible material such as deoxyribonucleic acid (DNA), amino acid, protein, or calcium, or an edible material such as natural pigment. These liquids can be used for, for example, an application such as an ink for inkjet, a surface treatment liquid, a constituent element of an electronic element or a light emitting element, a liquid for forming a resist pattern of an electronic circuit, or a material liquid for three-dimensional modeling.

The "liquid discharge apparatus 1" is not limited to an apparatus in which a liquid discharge head and an object to which a liquid can be attached are relatively moved. Specific examples of the liquid discharge apparatus 1 include a serial type apparatus that moves a liquid discharge head, and a line type apparatus that does not move a liquid discharge head.

Examples of the "liquid discharge apparatus 1" further include a treatment liquid application apparatus that discharges a treatment liquid onto a sheet in order to apply the treatment liquid to a surface of the sheet, for example, in order to modify the surface of the sheet, and a spraying granulation apparatus that sprays a composition liquid in which a raw material is dispersed in a solution via a nozzle to granulate fine particles of the raw material.

In the description of the above-described embodiments, the number of heads is changed based on productivity or the like, but the number of nozzles used in one head may be changed.

The embodiments and the modifications of the embodiments are included in the scope and gist of the invention, and are included in the invention described in the claims and equivalents of the claims. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2019-104023, filed on Jun. 3, 2019, in the Japan Patent Office, the entire disclosure of which is hereby incorporated by reference herein.

REFERENCE SIGNS LIST

1 Liquid discharge apparatus
3 Controller

4 Detection group
10 Print target (detection target)
20 Support stage
21 Attraction table
31 Unit control circuit
32 Memory
33 CPU
34 I/F
50 Gantry
71 Print mode determiner
72 Calculator
73 Head selector
74 Print mask selector
60, 60A to 60D Height detection sensor
100 Transporter
200 Carriage
206 Scanner
207 Height adjuster
300 Head unit
400 Irradiation unit
500 Maintenance unit

The invention claimed is:

1. A liquid discharge apparatus having a plurality of print modes, the liquid discharge apparatus comprising:
- determiner circuitry configured to determine the print modes;
- UV curable ink; and
- a controller configured to change, based on the print mode determined by the determiner circuitry, a use nozzle width and a discharge amount of the UV curable ink with a spot color head in a line feed direction such that a print mode having a low print speed has a narrower nozzle width and a larger discharge amount of the UV curable ink than a print mode having a high print speed.

2. The liquid discharge apparatus according to claim 1, wherein the controller changes the use nozzle width and the discharge amount of the spot color head in the line feed direction according to a productivity indicating a number of sheets to be printed per unit time.

3. The liquid discharge apparatus according to claim 2, wherein the controller makes a change such that the use nozzle width of the spot color head in the line feed direction is increased and the discharge amount is reduced when the productivity indicating the number of sheets that can be printed per unit time is a predetermined level or more, and the use nozzle width of the spot color head in the line feed direction is reduced and the discharge amount is increased when the productivity indicating the number of sheets that can be printed per unit time is less than the predetermined level.

4. The liquid discharge apparatus according to claim 1, wherein the controller changes the use nozzle width and the discharge amount of the spot color head in the line feed direction according to a line feed amount in the line feed direction.

5. The liquid discharge apparatus according to claim 4, wherein the controller makes a change such that the use nozzle width of the spot color head in the line feed direction is increased and the discharge amount is reduced when the line feed amount in the line feed direction is a predetermined amount or more, and the use nozzle width of the spot color head in the line feed direction is reduced and the discharge amount is increased when the line feed amount in the line feed direction is less than the predetermined amount.

6. The liquid discharge apparatus according to claim 1, wherein the controller changes the use nozzle width and the discharge amount of the spot color head in the line feed direction according to a resolution of the spot color head in the line feed direction.

7. The liquid discharge apparatus according to claim 6, wherein the controller makes a change such that the use nozzle width of the spot color head in the line feed direction is increased and the discharge amount is reduced when the resolution in the line feed direction is low, and the use nozzle width of the spot color head in the line feed direction is reduced and the discharge amount is increased when the resolution in the line feed direction is high.

8. The liquid discharge apparatus according to claim 1, further comprising:
- a plurality of spot color heads including the spot color head,
- wherein the controller sets a required ink discharge amount discharged from the plurality of spot color heads as A, sets a number of rows of spot color heads selected corresponding to the use nozzle width of the spot color head in the line feed direction as n representing an integer of two or more, sets a number of spot color heads used per row as m, and sets a discharge amount per spot color head as A/(n×m).

9. The liquid discharge apparatus according to claim 1, wherein the controller controls a process color head and the spot color head such that an image is formed on a print medium with the process color head, then a recording layer is formed with the spot color head, and then an image is formed again with the process color head.

10. A computer readable non-transitory recording medium storing a liquid discharge program of a liquid discharge apparatus having a plurality of print modes, the liquid discharge program being configured to cause a computer to perform:
- determining the print mode; and
- changing, based on the print mode which has been determined, a use nozzle width and a discharge amount of UV curable ink with a spot color head in a line feed direction such that a print mode having a low print speed has a narrower nozzle width and a larger discharge amount of the UV curable ink than a print mode having a high print speed.

11. A liquid discharge method for a liquid discharge apparatus having a plurality of print modes, the liquid discharge method comprising:
- determining the print modes; and
- changing, based on the print mode which has been determined, a use nozzle width and a discharge amount of UV curable ink with a spot color head in a line feed direction such that a print mode having a low print speed has a narrower nozzle width and a larger discharge amount of the UV curable ink than a print mode having a high print speed.

12. The method according to claim 11, wherein the changing further comprises:
- changing the use nozzle width and the discharge amount of the spot color head in the line feed direction according to a productivity indicating a number of sheets to be printed per unit time.

13. The method according to claim 12, wherein the changing further comprises:
- changing such that the use nozzle width of the spot color head in the line feed direction is increased and the discharge amount is reduced when the productivity indicating the number of sheets that can be printed per unit time is a predetermined level or more, and the use nozzle width of the spot color head in the line feed direction is reduced and the discharge amount is increased when the productivity indicating the number of sheets that can be printed per unit time is less than the predetermined level.

14. The method according to claim 11, wherein the changing further comprises:

changing the use nozzle width and the discharge amount of the spot color head in the line feed direction according to a line feed amount in the line feed direction.

15. The method according to claim 14, wherein the changing further comprises:

changing such that the use nozzle width of the spot color head in the line feed direction is increased and the discharge amount is reduced when the line feed amount in the line feed direction is a predetermined amount or more, and the use nozzle width of the spot color head in the line feed direction is reduced and the discharge amount is increased when the line feed amount in the line feed direction is less than the predetermined amount.

16. The method according to claim 11, wherein the changing further comprises:

changing the use nozzle width and the discharge amount of the spot color head in the line feed direction according to a resolution of the spot color head in the line feed direction.

17. The method according to claim 16, wherein the changing further comprises:

changing such that the use nozzle width of the spot color head in the line feed direction is increased and the discharge amount is reduced when the resolution in the line feed direction is low, and the use nozzle width of the spot color head in the line feed direction is reduced and the discharge amount is increased when the resolution in the line feed direction is high.

18. The method according to claim 11, further comprising:

setting a required ink discharge amount discharged from a plurality of spot color heads as A, sets a number of rows of spot color heads selected corresponding to the use nozzle width of the spot color head in the line feed direction as n representing an integer of two or more, sets a number of spot color heads used per row as m, and sets a discharge amount per spot color head as A/(n×m).

19. The method according to claim 11, further comprising:

controlling a process color head and the spot color head such that an image is formed on a print medium with the process color head;

forming with the spot color head a recording layer; and forming an image with the process color head.

* * * * *